United States Patent
Kim

(10) Patent No.: US 10,784,939 B2
(45) Date of Patent: Sep. 22, 2020

(54) METHOD AND APPARATUS FOR CALCULATING CQI IN A WIRELESS COMMUNICATION SYSTEM

(71) Applicant: LG ELECTRONICS INC., Seoul (KR)

(72) Inventor: Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/337,383

(22) PCT Filed: Sep. 28, 2017

(86) PCT No.: PCT/KR2017/010860
§ 371 (c)(1),
(2) Date: Mar. 27, 2019

(87) PCT Pub. No.: WO2018/062910
PCT Pub. Date: Apr. 5, 2018

(65) Prior Publication Data
US 2019/0326973 A1   Oct. 24, 2019

Related U.S. Application Data

(60) Provisional application No. 62/401,855, filed on Sep. 29, 2016.

(51) Int. Cl.
| | |
|---|---|
| *H04B 7/024* | (2017.01) |
| *H04B 7/0417* | (2017.01) |
| *H04B 7/0456* | (2017.01) |
| *H04B 7/06* | (2006.01) |
| *H04L 5/00* | (2006.01) |
| *H04W 88/06* | (2009.01) |

(52) U.S. Cl.
CPC .......... *H04B 7/0626* (2013.01); *H04B 7/024* (2013.01); *H04B 7/0417* (2013.01);
(Continued)

(58) Field of Classification Search
CPC .. H04B 7/0626; H04B 7/0417; H04B 7/0486; H04B 7/0617; H04B 7/0632;
(Continued)

(56) References Cited

U.S. PATENT DOCUMENTS

| | | |
|---|---|---|
| 2013/0329664 A1 | 12/2013 | Kim et al. |
| 2016/0050648 A1* | 2/2016 | Seo ............ H04B 7/0626 370/329 |

(Continued)

FOREIGN PATENT DOCUMENTS

| | | |
|---|---|---|
| WO | 2015176266 | 11/2015 |
| WO | 2016111524 | 7/2016 |

OTHER PUBLICATIONS

PCT International Application No. PCT/KR2017/010860, Written Opinion of the International Searching Authority dated Jan. 22, 2018, 16 pages.

(Continued)

*Primary Examiner* — Omar J Ghowrwal
(74) *Attorney, Agent, or Firm* — Lee Hong Degerman Kang Waimey

(57) ABSTRACT

Disclosed in the present invention is a method for a user equipment reporting channel state information to a base station in a wireless communication system. The method for reporting CSI comprises the steps of: receiving, from the base station, a channel state information-reference signal (CSI-RS) defined by at least two antenna ports; estimating the rank of a downlink channel based on the CSI-RS; configuring a plurality of precoders corresponding to the estimated rank with at least two precoder groups; calculating a channel quality indicator under the assumption that the at least two precoder groups are rotationally applied to at least one resource block unit, wherein precoders included in the precoder groups rotationally applied to the at least one resource block unit is rotationally applied to at least one resource element unit; and reporting the CSI including the calculated CQI to the base station.

6 Claims, 11 Drawing Sheets

(52) U.S. Cl.
CPC ......... *H04B 7/0486* (2013.01); *H04B 7/0617* (2013.01); *H04B 7/0632* (2013.01); *H04B 7/0639* (2013.01); *H04L 5/006* (2013.01); *H04L 5/0023* (2013.01); *H04L 5/0048* (2013.01); *H04L 5/0051* (2013.01); *H04L 5/0091* (2013.01); *H04W 88/06* (2013.01); *H04L 5/0057* (2013.01)

(58) Field of Classification Search
CPC ..... H04B 7/0639; H04B 7/024; H04L 5/0051; H04L 5/0057; H04L 5/0023; H04L 5/0048; H04L 5/006; H04L 5/0091; H04W 88/06
See application file for complete search history.

(56) References Cited

U.S. PATENT DOCUMENTS

2018/0242285 A1* 8/2018 Yoo ...................... H04B 7/0456
2019/0036574 A1* 1/2019 Zhu ...................... H04B 7/0639

OTHER PUBLICATIONS

Qualcomm, "Discussion on CSI reporting for hybrid CSI-RS", 3GPP TSG RAN WG1 Meeting #86, R1-166273, Aug. 2016, 3 pages.
Qualcomm, "Reference Signals and Procedures for CSI Acquisition", 3GPP TSG RAN WG1 Meeting #86, R1-166381, Aug. 2016, 5 pages.

* cited by examiner (a) Control-plane protocol stack (b) User-plane protocol stack

METHOD AND APPARATUS FOR CALCULATING CQI IN A WIRELESS COMMUNICATION SYSTEM

CROSS-REFERENCE TO RELATED APPLICATIONS

This application is the National Stage filing under 35 U.S.C. 371 of International Application No. PCT/KR2017/010860, filed on Sep. 28, 2017, which claims the benefit of U.S. Provisional Application No. 62/401,855, filed on Sep 29, 2016, the contents of which are all hereby incorporated by reference herein in their entirety.

TECHNICAL FIELD

The present invention relates to a wireless communication system, and more particularly, to a method of feeding back hybrid CSI for open-loop MIMO transmission in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the technical task of the present invention is to propose a method of feeding back hybrid CSI for open-loop MIMO transmission in a wireless communication system and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In one technical aspect of the present invention, provided herein is a method of reporting Channel Status Information (CSI) to a base station by a user equipment in a wireless communication system, the method including receiving Channel Status Information-Reference Signal (CSI-RS) defined as two or more antenna ports from the base station, estimating a rank of a downlink channel based on the CSI-RS, configuring a plurality of precoders corresponding to the estimated rank into two or more precoder groups, calculating Channel Quality Indicator (CQI) on the assumption that the two or more precoder groups are circularly applied in at least one resource block unit and that precoders included in the circularly applied precoder group are circularly applied in at least one resource element unit, and reporting the CSI including the calculated CQI to the base station.

In another technical aspect of the present invention, provided herein is a user equipment in a wireless communication system, the user equipment including a wireless communication module and a processor connected to the wireless communication module, the processor configured to receive Channel Status Information-Reference Signal (CSI-RS) defined as two or more antenna ports from a base station, wherein the process is further configured to estimate a rank of a downlink channel based on the CSI-RS, configure a plurality of precoders corresponding to the estimated rank into two or more precoder groups, calculate Channel Quality Indicator (CQI) on the assumption that the two or more precoder groups are circularly applied in at least one resource block unit and that precoders included in the circularly applied precoder group are circularly applied in at least one resource element unit, and report the CSI including the calculated CQI to the base station.

Preferably, each of a plurality of the precoders is configured with antenna port selection vectors and precoders included in a same precoder group are configured with a same antenna port vector. More preferably, the same antenna port vectors have different co-phases.

Preferably, the at least one resource block unit is a subband unit and the CQI is calculated in the subband unit.

Additionally, the CSI reported to the base station may include information on the estimated rank.

Advantageous Effects

According to an embodiment of the present invention, a second CSI among hybrid CSIs for open-loop MIMO transmission in a wireless communication system can be reported more effectively.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

Figure 1:
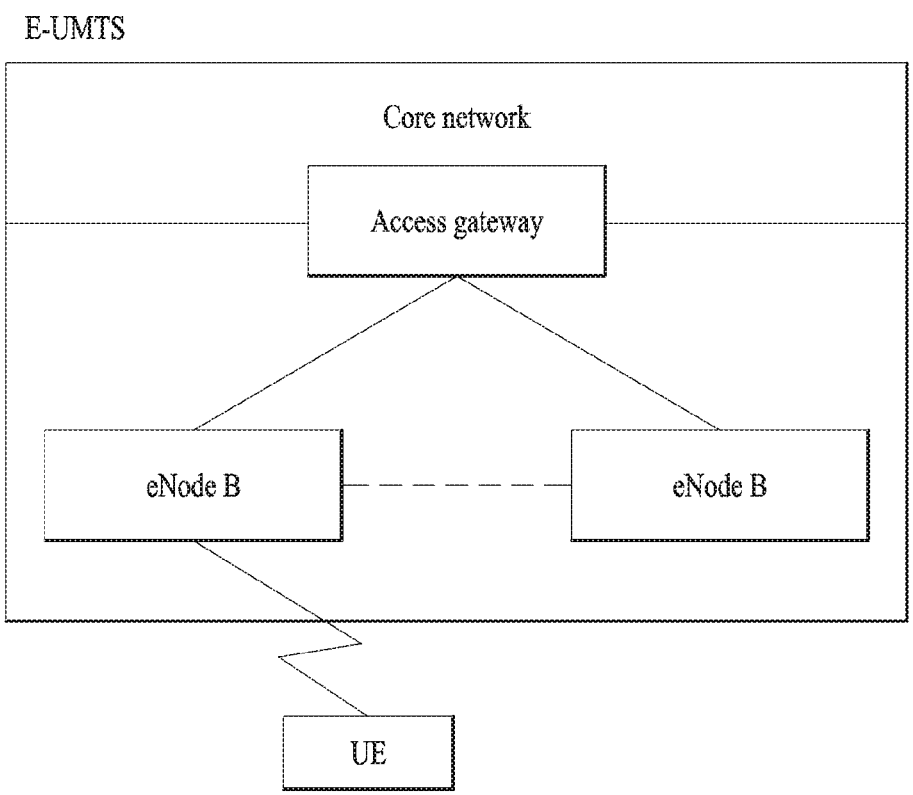
FIG. 1 is a diagram schematically illustrating a network structure of an E-UMTS as an exemplary radio communication system.
Figure 2:
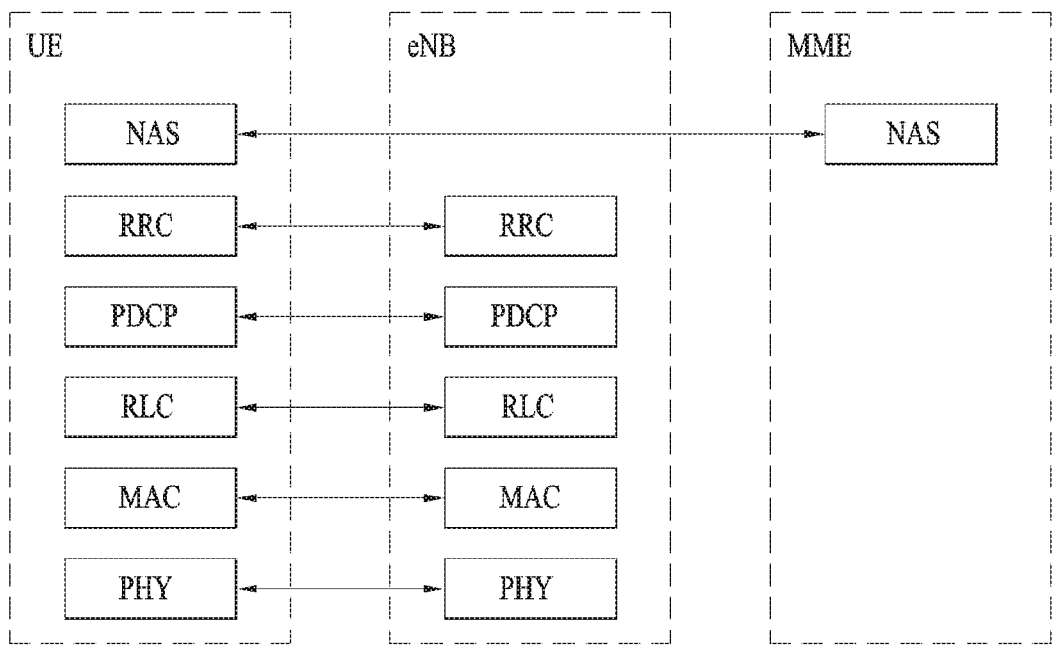
FIG. 2 is a diagram illustrating structures of a control plane and a user plane of a radio interface protocol between a UE and an E-UTRAN based on the 3GPP radio access network specification.
Figure 2:
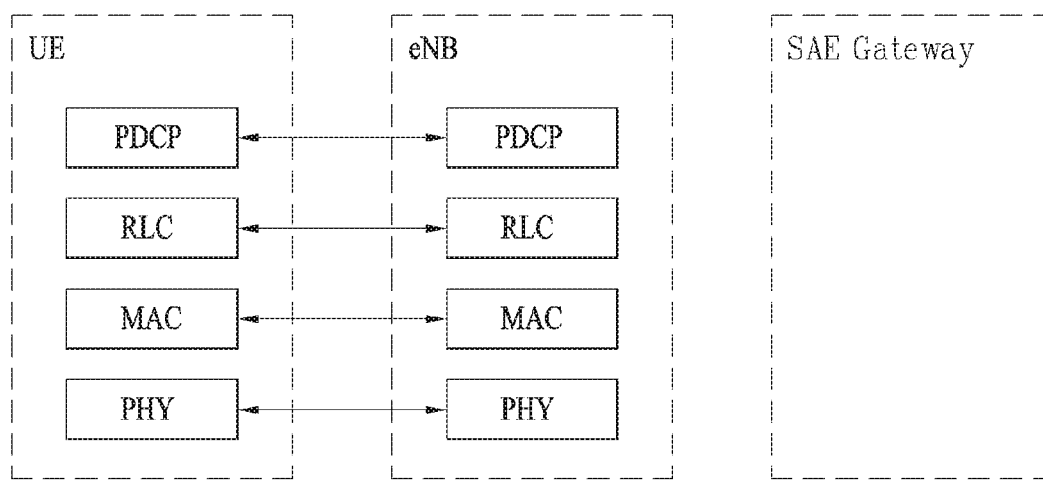

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC.

A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
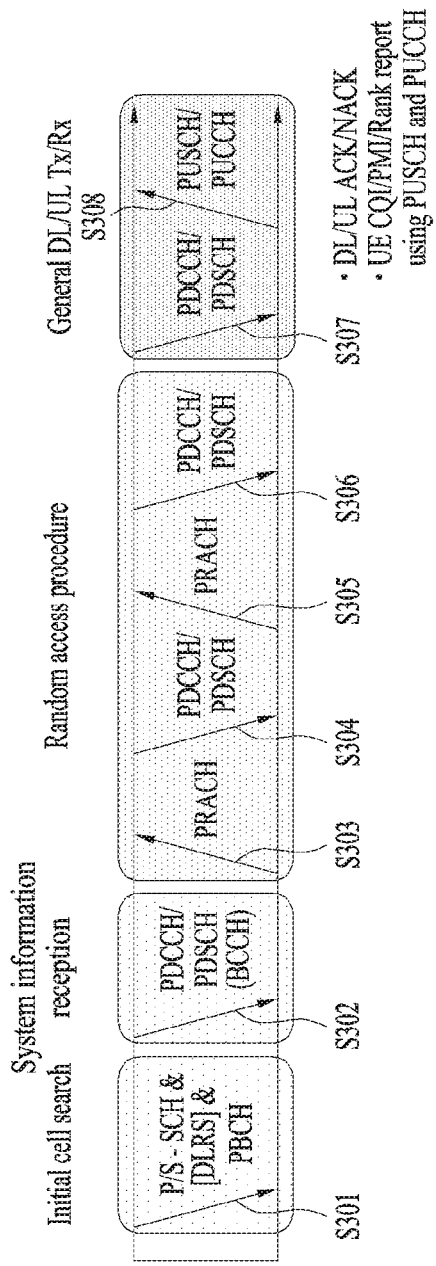
FIG. 3 is a diagram illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
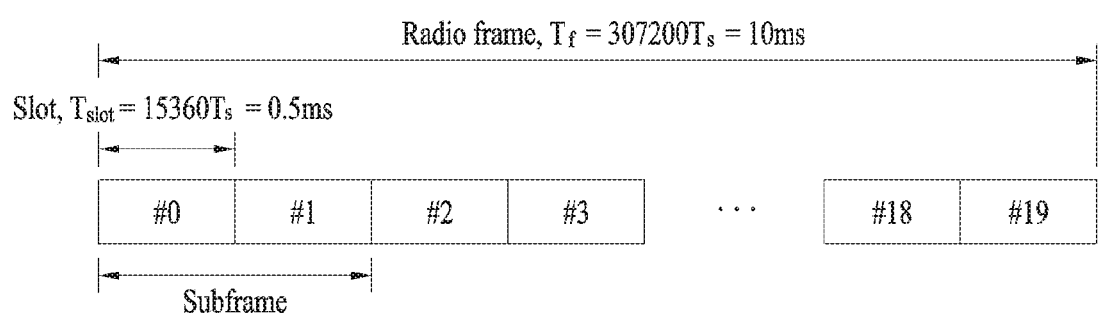
FIG. 4 is a diagram illustrating the structure of a radio frame used in an LTE system.

FIG. 4 is a view illustrating the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15\ kHz \times 2048)=3.2552 \times 10^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
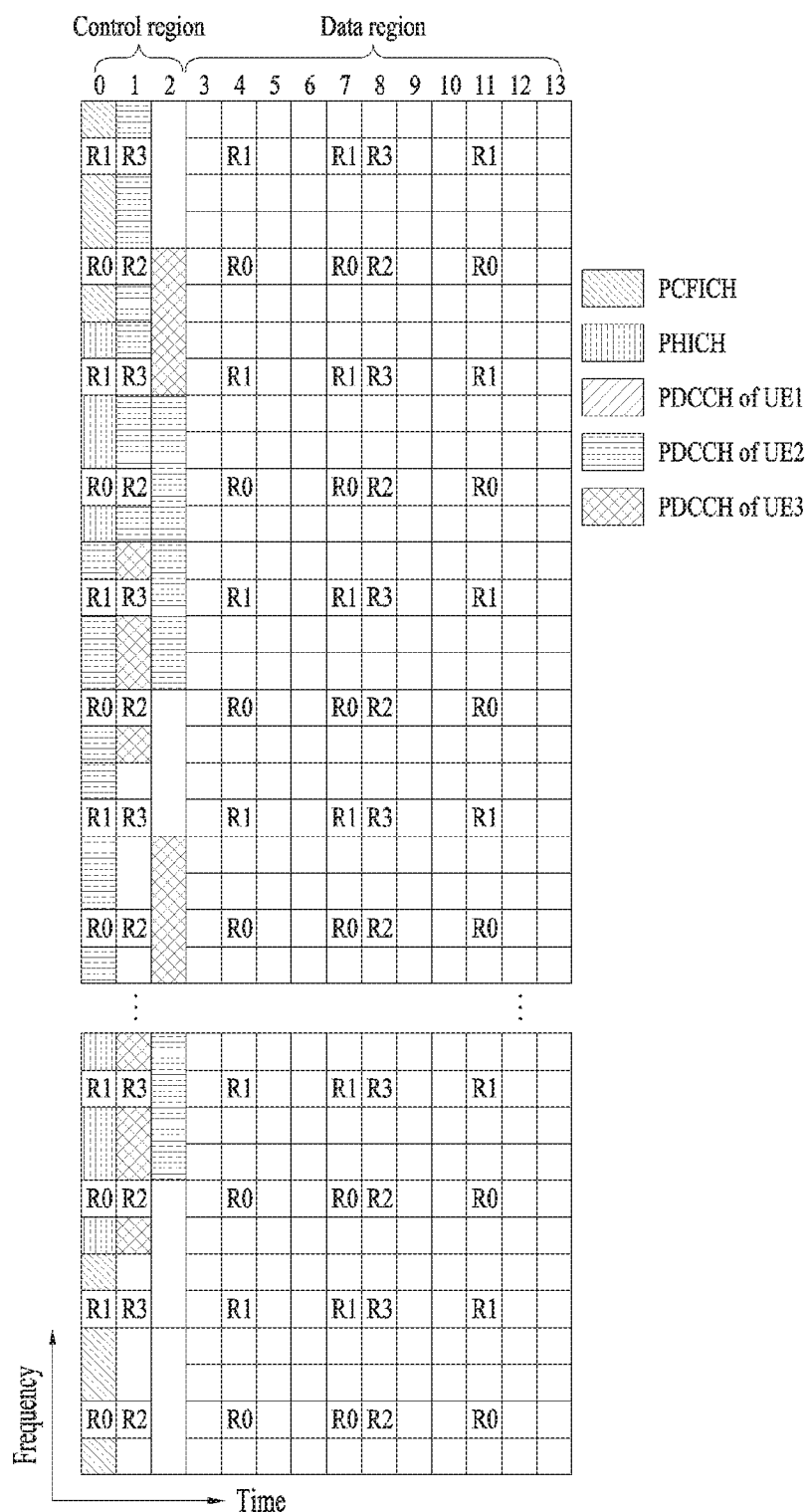
FIG. 5 is a diagram illustrating the structure of a DL radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
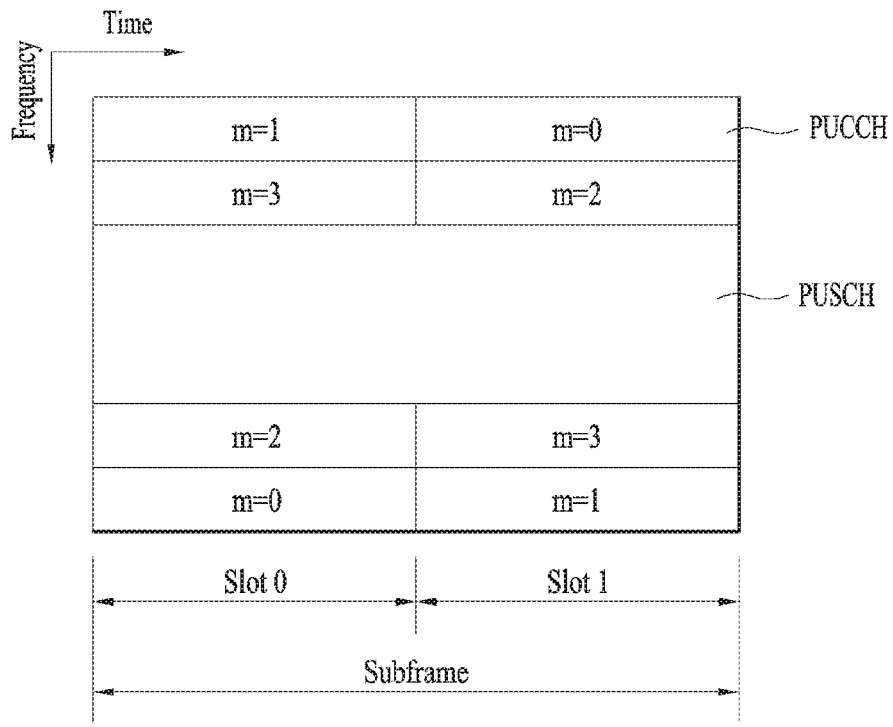
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
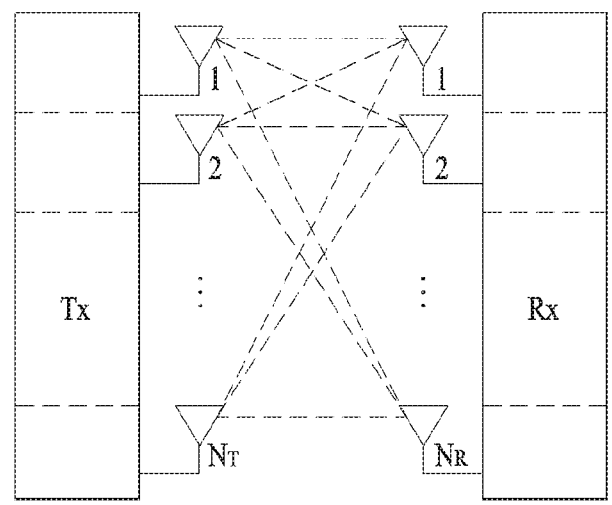
FIG. 7 is a diagram illustrating a configuration of a general MIMO communication system.

The configuration of a general MIMO communication system is shown in FIG. 7.

A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns A rank of a channel matrix H, rank(H), is restricted as follows.

$$\text{rank}(H) \leq \min(N_T, N_R)$$ [Equation 6]

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R)$$ [Equation 7]

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel Status Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1 W2)$$ [Equation 8]

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \text{ where } X_i \text{ is } Nt/2 \text{ by } M \text{ matrix.}$$ [Equation 9]

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r \text{ columns}}$$

(if rank = r), where $1 \leq k, l, m \leq M$ and $k, l, m$ are integer.

Here, NT indicates the number of Tx antennas. M is the number of columns of the matrix Xi and indicates that total M candidate column vectors exist in the matrix Xi. Moreover, $e^k_M$, $e^l_M$ and $e^m_M$ indicate $k^{th}$, $l^{th}$ and $m^{th}$ column vectors of Xi, respectively as column vectors, in which $k^{th}$, $l^{th}$ and $m^{th}$ elements correspond to 1 and the rest of elements correspond to 0 among M elements. $\alpha_j$, $\beta_j$, and $\gamma_j$ are complex values having unit norms and indicate that, when $k^{th}$, $l^{th}$ and $m^{th}$ column vectors of the matrix Xi are selected, phase rotations are applied to the selected column vectors, respectively. Here, i is an integer equal to or greater than 0 and indicates a PMI index indicating W1. And, j is an integer equal to or greater than 0 and indicates a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

In the LTE system, as described above, Chanel State Information (CSI) includes CQI, PMI, RI and the like, by which the CSI is non-limited. According to a transmission mode of each UE, CQI, PMI and RI may be transmitted all or in part. A case of transmitting CSI periodically is called a periodic reporting. A case of transmitting CSI in response to a request made by a base station is called an aperiodic reporting.

In case of the aperiodic reporting, a request bit included in UL scheduling information downloaded by a base station is transmitted to a UE. Thereafter, the UE delivers CSI considering a transmission mode of the UE to the base station through a UL data channel (PUSCH).

In case of the periodic reporting, a period, an offset in the corresponding period and the like are signaled per UE in subframe unit in a semi-static manner through a higher layer signal. Each UE delivers CSI considering a transmission mode to a base station according to a determined period through a UL control channel (PUCCH). If UL data simultaneously exists in a CSI transmitted subframe, CSI is transmitted through UL data channel (PUSCH) together with the data.

A base station transmits transmission timing information suitable for each UE to the corresponding UE by considering a channel status of each UE, a UE distribution status and the like. The transmission timing information includes a period, offset and the like for transmitting CSI and can be transmitted to each UE through an RRC message.

Cooperative Multipoint Transmission/Reception (CoMP) is described as follows.

A system since LTE-A intends to employ a method of increasing performance of a system by enabling cooperation among multiple cells. Such a method is called Cooperative Multipoint Transmission/Reception (CoMP). CoMP indicates a method that two or more base stations, access points or cells communicate with a UE cooperatively in order to perform communication between a specific UE and a base station, access point or cell more smoothly. In present invention, a base station, an access or a cell may be used in the same sense.

Generally, in a multi-cell environment having a frequency reuse factor set to 1, performance and average sector throughput of a UE located on a cell-edge may be lowered due to Inter-Cell Interference (ICI). In order to reduce such ICI, a legacy LTE system employs a method of enabling a UE located on a cell-edge to have an appropriate throughput in an environment restricted by interference using a simple manual scheme such as Fractional Frequency Reuse (FFR) through a UE-specific power control. Yet, it may be more preferable to reduce ICI or reuse ICI as a signal desired by a UE rather than to lower a frequency resource use per cell. To achieve such an object, a CoMP transmission scheme is applicable.

Figure 8:
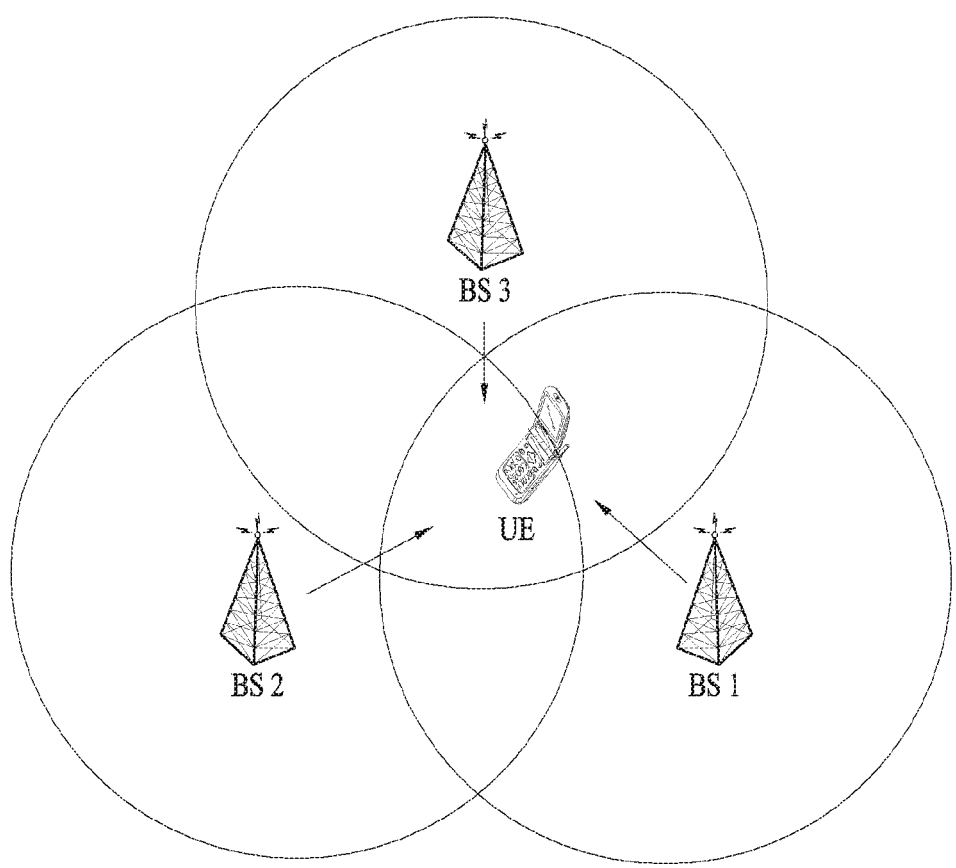
FIG. 8 shows one example of performing CoMP.

FIG. 8 shows one example of performing CoMP. referring to FIG. 8, a wireless communication system includes a plurality of base stations BS1, BS2 and BS3 performing CoMP and a UE. A plurality of the base stations BS1, BS2 and BS3 performing CoMP can efficiently transmit data to the UE by cooperating with each other.

A CoMP transmission scheme can be categorized into a CoMP-Joint Processing (CoMP-JP) scheme that is a cooperative MIMO type joint processing through data sharing and a CoMP-Coordinated Scheduling/Beamforming (CoMP-CS/CB) scheme.

In case of Downlink (DL), in a joint processing (CoMP-JP) process, a UE can simultaneously receive data from a plurality of base stations performing CoMP transmission scheme and is able to improve reception performance by combining signals respectively received from the base stations (Joint Transmission (JT)). Moreover, it is able to consider a method that one of base stations performing a CoMP transmission scheme transmits data to a UE at a specific timing (Dynamic Point Selection (DPS). In case of Coordinated Scheduling/Beamforming (CoMP-CS/CB) scheme, a UE can receive data instantaneously through a single base station, i.e., a serving base station.

In case that Joint Processing (CoMP-JP) scheme is applied in Uplink (UL), a plurality of base stations can simultaneously receive PUSCH signal from a UE (Joint Reception (JR)). On the contrary, in case of Coordinated Scheduling/Beamforming (CoMP-CS/CB) scheme, a single base station can receive PUSCH. Decision to use Coordinated Scheduling/Beamforming (CoMP-CS/CB) scheme can be made by coordinated cells (or base stations).

A UE that uses CoMP transmission scheme, i.e., a CoMP UE can send feedback (hereinafter CSI feedback) of channel information to a plurality of base stations performing CoMP transmission scheme. A network scheduler can select an appropriate CoMP transmission scheme capable of raising a transmission rate from CoMP-JP, CoMP-CS/CB and DPS on the basis of the CSI feedback. To this end, the CoMP UE can follow a periodic feedback transmission scheme using UL PUCCH as a method of configuring CSI feedback within a plurality of base stations performing CoMP transmission scheme. In this case, feedback configurations for the respective base stations may be mutually independent from each other. Therefore, in this disclosure according to one embodiment of the present invention, each operation of feeding back channel information with such an independent feedback configuration shall be named a CSI process. One or more CSI processes may exist in a single serving cell.

Figure 9:
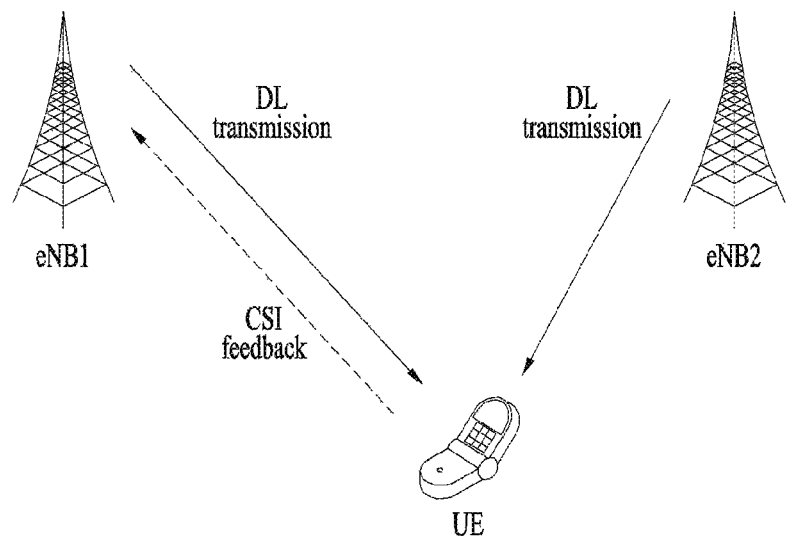
FIG. 9 shows a case of performing a downlink CoMP operation.

FIG. 9 shows a case of performing a DL CoMP operation.

In FIG. 9, a UE is located between eNB1 and eNB2. To solve an interference problem caused to the UE, the two eNBs (i.e., eNB1 and eNB2) perform an appropriate CoMP operation such as JT, DPS, CS/CB and the like. To help the CoMP operation of the base station, the UE performs an appropriate CSI feedback. Information transmitted through the CSI feedback includes PMI information and CQI information of each eNB and may further include channel information (e.g., phase offset information between two eNB channels) between the two eNBs for JT.

In FIG. 9, although the UE transmits a CSI feedback signal to the eNB1 that is a serving cell of the UE, it may transmit a CSI feedback signal to the eNB2 or both of the eNBs depending on a situation. Moreover, although an eNB is described as a basic unit that participates in CoMP in FIG. 9, the contents of the present invention are applicable to CoMP between transmission points controlled by a single eNB.

Namely, in order to perform CoMP scheduling on a network, a UE should feed back DL CSI information of a neighbor eNB/TP participating in the CoMP as well as DL CSI information of a serving eNB/TP. To this end, the UE feeds back a multitude of CSI processes that reflect various interference environments with various data transmitting eNB/TP.

Therefore, when CoMP CSI is calculated in an LTE system, IMR is used for interference measurement. A single UE can receive configuration of a plurality of IMRs and has an independent configuration for each of a plurality of the IMRs. Namely, a period, offset and resource configuration are independently configured for each IMR and a base station can signal it to the UE using higher layer signaling (e.g., RRC, etc.).

Moreover, CSI-RS is used for channel measurement desired for CoMP CSI calculation in an LTE system. A single UE can receive configuration of a plurality of CSI-RSs. In this case, each of the CSI-RSs has an independent configuration. Namely, a period, offset, resource configuration, power control (pc) and antenna port number are configured independently for each CSI-RS, and information related to the CSI-RS is signaled to a UE from a base station through higher layer signaling (e.g., RRC, etc.).

Among a plurality of CSI-RSs and a plurality of IMRs configured for a UE, a single CSP process can be defined in association with a single CSI-RS resource for signal measurement and a single Interference Measurement Resource (IMR) for interference measurement. The UE feeds back CSI information derived from different CSI processes to a network (e.g., base station) with an independent period and subframe offset.

Namely, each CSI process has an independent CSI feedback configuration. The base station can inform the UE of such a CSI-RS resource, IMR resource information, CSI feedback configuration and the like through higher layer signaling such as RRC or the like per CSI process. For example, assume that three CSI processes like Table 1 are configured for a UE.

TABLE 1

| CSI Process | Signal Measurement Resource (SMR) | IMR |
|---|---|---|
| CSI Process 0 | CSI-RS 0 | IMR 0 |
| CSI Process 1 | CSI-RS 1 | IMR 1 |
| CSI Process 2 | CSI-RS 0 | IMR 2 |

In Table 1, CSI-RS #0 and CSI-RS#1 indicate CSI-RS received from an eNB 1 that is a serving eNB of a UE and CSI-RS received from an eNB 2 that is a neighbor eNB participating in cooperation, respectively. Assume that Table 2 is set for an IMR configured for each CSI process of Table 1.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

On IMR 0, eNB 1 performs muting and eNB 2 performs data transmission. And, UE is configured to measure interference from other eNBs except eNB 1 from IMR 0. Likewise, on IMR 1, eNB 2 performs muting and eNB 1 performs data transmission. And, UE is configured to measure interference from other eNBs except eNB 2 from IMR 1. Moreover, on IMR 2, both eNB 1 and eNB 2 perform muting. And, UE is configured to measure interference from other eNBs except eNB 1 and eNB 2 from IMR 2.

Therefore, as shown in Table 1 and Table 2, CSI information of CSI process 0 indicates optimal RI, PMI and CQI informations if data is received from eNB 1. CSI information of CSI process 1 indicates optimal RI, PMI and CQI informations if data is received from eNB 2. CSI information of CSI process 2 indicates optimal RI, PMI and CQI informations if data is received from eNB 1 and interference is not caused from eNB 2 at all.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 10:
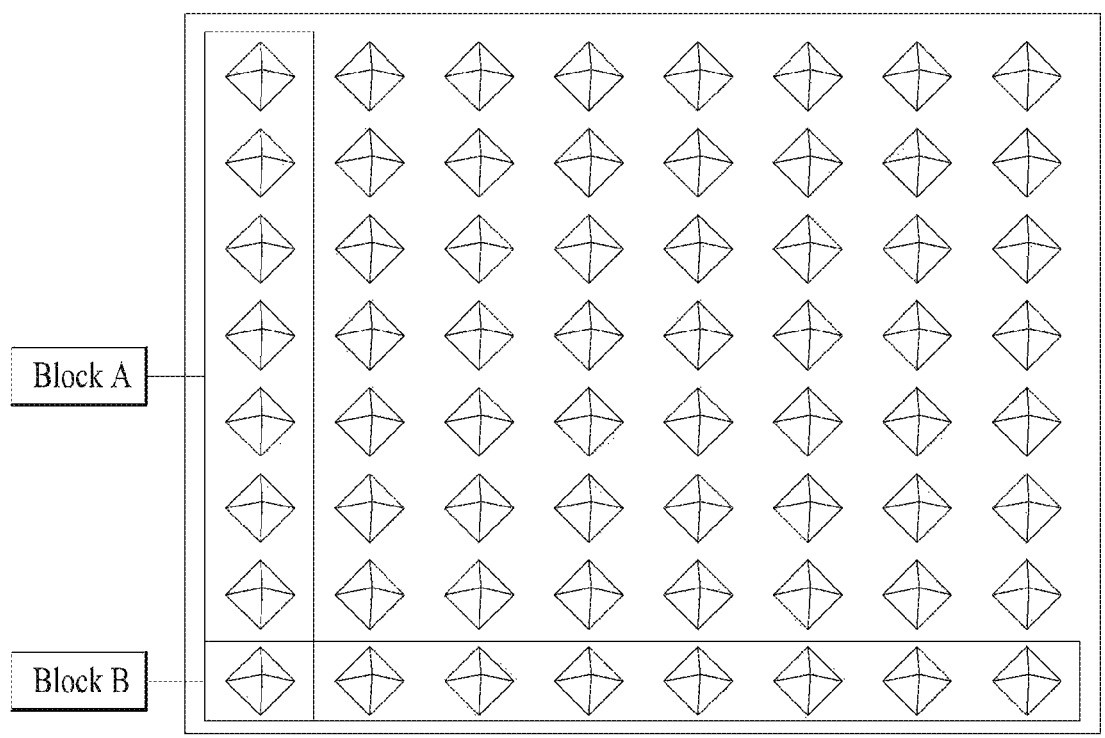
FIG. 10 shows an example of implementation of 2D-AAS.

FIG. 10 illustrates an example of implementation of the 2D-AAS. In particular, FIG. 10 presumes a co-polarized antenna array in which each antenna element has the same polarization. Referring to FIG. 10, the 2D-AAS is expected to be constructed as a system having a plurality of antennas by installing antennas in a vertical direction and a horizontal direction.

In a 2D-AAS applied Full Dimension-MIMO (FD-MIMO) system, a base station can configure several CSI-RS resources for a UE in a single CSI process. Here, the CSI process means an operation of feeding back channel information with an independent feedback configuration.

In this case, the UE does not consider a CSI-RS resource configured within a single CSI process as an independent channel, assumes a single huge CSI-RS resource by aggregating the corresponding CSI-RS resources, and calculates & feeds back CSI based on the huge CSI-RS resource. For example, the base station configures three 4-port CSI-RS resources within a signal CSI process for the UE, and the UE assumes a single 12-port CSI-RS resource by aggregating the three 4-port CSI-RS resources. The UE calculates and feeds back CSI using 12-port PMI based on this CSI-RS resource. Such a reporting mode is referred to as Class A CSI reporting in the LTE-A system.

Or, the UE assumes each of the CSI-RS resources as an independent channel, selects one of the CSI-RS resources, and then calculates & reports CSI on the basis of the selected resource. Namely, the UE selects a CSI-RS of a strong channel from the 8 CSI-RS resources, calculates CSI on the basis of the selected CSI-RS, and reports the CSI to the base station. In doing so, the UE additionally reports the selected CSI-RS to the base station via CRI (CSI-RS resource indicator). For example, if a channel of the first CSI-RS corresponding to T(0) is the strongest, the UE sets CRI=0 and then reports it to the base station. Such a reporting mode is referred to as Class B CSI reporting in the LTE-A system.

In order to effectively show the aforementioned characteristic, variables described in the following can be defined for a CSI process in Class B. K means the number of CSI-RS resources existing in the CSI process. $N_k$ means the number of CSI-RS ports of a $k^{th}$ CSI-RS resource.

Meanwhile, in order to further improve FD MIMO system, the 3GPP standardization recently employs hybrid CSI. This is described in detail with reference to the drawings as follows.

Figure 11:
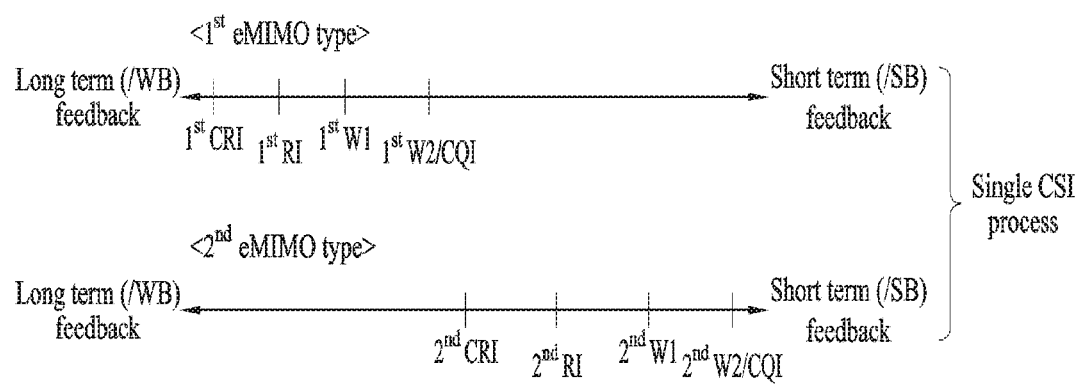
FIG. 11 is a diagram showing an example of the concept of hybrid CSI.

FIG. 11 is a diagram showing an example of the concept of hybrid CSI.

Referring to FIG. 11, two enhanced MIMO (eMIMO) types exist in a single CSI process. CSI exists per eMIMO type. CSI of a first eMIMO type is fed back in a long term longer than a second eMIMO type or transmits CSI information on a wideband (WB). Namely, a base station configures a single CSI process configured with the first eMIMO type and the second eMIMO type for a UE (i.e., forwards CSI process information through higher layer). The base station changes beamforming applied to CSI-RS of the second eMIMO type using CSI information of the first eMIMO type received from the UE. And, the UE reports CSI with reference to the CSI-RS of the second eMIMO type.

In FIG. 11, CSI of the first eMIMO type and CSI of the second eMIMO type are defined as a first CSI (i.e., first CRI, first RI, first W1, first W2, and first CQI) and a second CSI (i.e., second CRI, second RI, second W1, second W2, and second CQI), respectively.

Table 3 exemplarily shows the operation mechanism of hybrid CSI, reflected by the 3GPP standardization. In particular, in case of hybrid CSI reporting mechanism 1, a presence or non-presence of transmission of RI in the first CSI is not determined yet (FFS) and W1 is reported. Since K that means the number of CSI-RS(s) determined in one class B CSI process is 1, CRI in the second CSI is not reported but R1, W2 and CQI are reported. And, a presence or non-presence of reporting of W1 is determined according to class B PMI configuration of the second eMIMO type that is RRC-signaled (i.e., if PMI configuration is 0, W1 is reported. If PMI configuration is 1, W1 is not reported.)

In the following, the present invention is described with reference to Table 3 and FIG. 11. Yet, Table 3 and FIG. 11 are examples for clarity of description only, and the technical idea of the present invention is applicable to modification of the hybrid CSI reporting mechanism as well.

Prior to the description of the present invention, the LD-CDD scheme of the current LTE system is described. Currently, LD-CDD scheme in the LTE system is defined as Equation 11.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 11]}$$

In Equation 11, $x(i)=[x^{(0)}(i) \ldots x^{(v-1)}(i)]^T$ is a data symbol vector to which precoding is not applied and $y(i)=[y^{(0)}(i) \ldots y^{(P-1)}(i)]^T$ is a transmitted (Tx) signal vector to which precoding is applied. Moreover, v and P mean the number of Tx layers and the number of antenna ports, respectively. In Equation 11, W(i) means a precoding matrix that adjusts a channel. Hence, to meet the change of channel, it is able to select and use an appropriate codeword from a codebook.

Yet, in the LD-CDD scheme of the current LTE system, a codeword is not selected and used according to a channel situation. W(i) used by the LTE system is expressed in Equation 12.

$$\begin{cases} W(i) = C_1 & \text{for 2 antenna ports} \\ W(i) = C_k, k = \left(\left\lfloor \frac{i}{v} \right\rfloor \bmod 4\right) + 1 \in \{1, 2, 3, 4\} & \text{for 4 antenna ports} \end{cases} \quad \text{[Equation 12]}$$

In Equation 12, $C_k$ means a codeword. Hence, W(i) corresponds to a changed channel with a fixed value or a value having a predetermined pattern.

On the other hand, D(i) and U in Equation 11 play a role in distributing signals of a layer domain to all virtual antennas at the same rate by mixing all Tx layers together in a domain. Eventually, all layers have the same channel quality. Thus, if layers are averaged, it plays a great role in reducing signal overhead. For example, when a receiving end uses a linear Minimum Mean Square Error (MMSE) scheme, feedback of a single CQI is enough and individual HARQ retransmissions are not necessary for different layers, whereby DL control signaling can be reduced. D(i) and U used by the current LTE system are defined as Table 4.

TABLE 3

| | Type | $1^{st}$ CRI | $1^{st}$ RI | $1^{st}$ W1 | $1^{st}$ W2/CQI | $2^{nd}$ CRI | $2^{nd}$ RI | $2^{nd}$ W1 | $2^{nd}$ W2 | $2^{nd}$ CQI |
|---|---|---|---|---|---|---|---|---|---|---|
| Mechanism 1 | A + B w/ K = 1 | N.A. (Class A) | FFS | ○ | X | X (K = 1) | ○ | Depending on PMI config | ○ | ○ |
| Mechanism2 | B + B w/ K = 1 | ○ (K > 1) | X | X | X | X (K = 1) | ○ | ○ | ○ | ○ |

TABLE 4

| Number of layers υ | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 1 \\ 1 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

The above-described LD-CDD system shall be further generalized and described as follows. In Equation 11, W(i) is defined as a precoder related to a channel, U is generalized into a unitary matrix, and D(i) is generalized into a diagonal matrix of which diagonal terms have phase differences only in the same size.

TABLE 13

$$D(i) = \begin{bmatrix} 1 & 0 & \cdots & 0 \\ 0 & e^{j\theta_{1,i}} & \cdots & 0 \\ \vdots & \vdots & \ddots & 0 \\ 0 & 0 & 0 & e^{j\theta_{v-1,i}} \end{bmatrix}$$

Referring to Equation 13, it can be observed that D(i) is phase-shifted according to a frequency. If the generalized W(i), D(i) and U are applied to Equation 11, beamforming is performed in a manner that all layers are changed according to a frequency by D(i) and U. Particularly, a covariance matrix of a transmission vector y can be calculated as Equation 14.

$$R_{yy}^{(i)} = E[y(i)(y(i))^H] = W(i)D(i)UU^H(D(i))^H(W(i))^H = W(i)(W(i))^H \quad \text{[Equation 14]}$$

Assuming that W(i) is used as a precoder intending to increase a channel gain using a high eigenvalue of a channel maximally, D(i) and U in Equation 14 do not change a covariance matrix of a transmission vector. Hence, it can be observed that D(i) and U focus on averaging a total layer channel quality while preserving such a channel gain.

As described above, in case that a base station establishes 2D-AAS, an antenna in a vertical direction is installed together as well. If the existing LC-CDD scheme obtains a diversity gain by exchanging beams in a vertical direction with each other, it is preferable that a 2D-AAS base station changes a beam in a vertical direction together to obtain a more diversity gain. Hence, an LD-CDD scheme of changing a beam in a vertical direction together is proposed recently.

Yet, the LD-CDD scheme of changing a beam in a vertical direction together has a problem. Basically, according to the LD-CDD scheme of the current LTE system, a base station and a UE know each other in advance. The base station informs the UE of channels to the UE from horizontal antenna ports through CRS for the horizontal antenna ports. And, the UE is then aware of a final channel by applying a precoder to the channel indicated through the CRS. In doing so, if a base station having installed 2D-AAS uses a precoder for up to a vertical beam by modifying it, CRS ports will be necessary as many as the total number of antenna ports of the base station. Yet, since CRS is defined as 4 antenna ports currently, DM-RS based LD-CDD scheme is proposed.

Particularly, if semiOpenLoop transmission is configured through a higher layer and a rank is 1, PDSCH is transmitted through DM-RS ports 7 and 8 by a transmission diversity scheme and a precoded signal $y(i)=[y^{(7)}(i)\ y^{(8)}(i)]^T$ is generated by Equation 15. In Equation 15, $i=0,1,\ldots,M_{symb}^{ap}-1$, $M_{symb}^{ap}=2M_{symb}^{layer}$, and $\bar{p}=7$.

$$\begin{bmatrix} y^{(\bar{p})}(2i) \\ y^{(\bar{p}+1)}(2i) \\ y^{(\bar{p})}(2i+1) \\ y^{(\bar{p}+1)}(2i+1) \end{bmatrix} = \frac{1}{\sqrt{2}}\begin{bmatrix} 1 & j & 0 & 0 \\ 0 & 0 & -1 & j \\ 0 & 0 & 1 & j \\ 1 & -j & 0 & 0 \end{bmatrix}\begin{bmatrix} \text{Re}(x^{(0)}(i)) \\ \text{Im}(x^{(0)}(i)) \\ \text{Re}(x^{(1)}(i)) \\ \text{Im}(x^{(1)}(i)) \end{bmatrix} \quad \text{[Equation 15]}$$

Moreover, if semiOpenLoop configuration is configured through a higher layer and a rank is 2, PDSCH is transmitted through DM-RS ports 7 and 8 by a spatial multiplexing scheme and a precoded signal $y(i)=[y^{(7)}(i)\ y^{(8)}(i)]^T$ is generated by Equation 16. In Equation 16, $i=0,1,\ldots,M_{symb}^{ap}-1$, $M_{symb}^{ap}=2M_{symb}^{layer}$, and $\bar{p}=7$. And, it means that $\theta_n=\pi(i\bmod 2)/2$.

$$\begin{bmatrix} y^{(\bar{p})}(i) \\ y^{(\bar{p}+1)}(i) \end{bmatrix} = \frac{1}{\sqrt{2}}\begin{bmatrix} 1 & j & 1 & j \\ e^{j\theta_n} & je^{j\theta_n} & -e^{j\theta_n} & -je^{j\theta_n} \end{bmatrix}\begin{bmatrix} \text{Re}(x^{(0)}(i)) \\ \text{Im}(x^{(0)}(i)) \\ \text{Re}(x^{(1)}(i)) \\ \text{Im}(x^{(1)}(i)) \end{bmatrix} \quad \text{[Equation 16]}$$

Eventually, according to the semi-open-loop based transmission, a UE performs feedback on W and a base station performs beam cycling using the fed-back W.

In the following description, if the open-loop or semi-open-loop transmission of the present invention applies the hybrid CSI reporting, operations of a base station and UE are proposed. A base station transmits a CSI-RS beamformed by applying beamforming to CSI-RS based on a first CSI information. In doing so, a different beam is applied per CSI-RS port. For example, as W1 means a beam group in a dual codebook structure, a base station can obtain first PMIs, i.e., a beam group based on a first W1 and a first RI fed back by a UE and apply N beam in the beam group to N CSI-RS ports, respectively. As a result, it is able to generate BF CSI-RS having a different beamforming applied per CSI-RS port.

A base station can obtain beamforming information, which will be applied to CSI-RS, through various methods as well as through the hybrid CSI reporting scheme. For example, the base station can obtain the corresponding information through Discovery Reference Signal (DRS) or obtain beamforming information, which will be applied to CSI-RS, by estimating a DL channel by channel reciprocity after estimating a UL channel with Sounding Reference Signal (SRS). Or, after a specific CSI-RS for obtaining beamforming information to be applied to a corresponding CSI-RS has been defined, it is able to obtain the beamforming information to be applied to the corresponding CSI-RS by receiving feedback of a beam direction with PMI through a third CSI process including the specific CSI-RS. Through the above-described various schemes, a beamformed CSI-RS is generated by applying a different beam excellent in long-term aspect to each port of CSI-RS.

Meanwhile, according to the current 3GPP standard, a base station can activate a W2 independent feedback mode by setting a value of alternativeCodebookEnabled-CLASSB_K1 field to TRUE (i.e., 1) through higher layer signaling for a CSI process having a formed CSI-RS defined therein. This is a mode of using W2 only without W1 in a dual codebook structure. In this case, W2 is defined as Tables 5 to 7. Particularly, Tables 5 to 7 correspond to a case that the number of antenna ports is 2 (port 15 and port 16), a case that the number of antenna ports is 4 (ports 15 to 18), and a case that the number of antenna ports is 8 (ports 15 to 22), respectively.

TABLE 5

| Codebook index, n | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |

TABLE 6

| Codebook index, n | Number of layers $\upsilon$ | | | |
|---|---|---|---|---|
| | 1 | 2 | 3 | 4 |
| 0 | $\frac{1}{\sqrt{2}}\begin{bmatrix}e_0^{(2)}\\e_0^{(2)}\end{bmatrix}$ | $\frac{1}{2}\begin{bmatrix}e_0^{(2)} & e_0^{(2)}\\e_0^{(2)} & -e_0^{(2)}\end{bmatrix}$ | $\frac{1}{\sqrt{6}}\begin{bmatrix}e_0^{(2)} & e_0^{(2)} & e_1^{(2)}\\e_0^{(2)} & -e_0^{(2)} & -e_1^{(2)}\end{bmatrix}$ | $\frac{1}{2\sqrt{2}}\begin{bmatrix}e_0^{(2)} & e_1^{(2)} & e_0^{(2)} & e_1^{(2)}\\e_0^{(2)} & e_1^{(2)} & -e_0^{(2)} & -e_1^{(2)}\end{bmatrix}$ |
| 1 | $\frac{1}{\sqrt{2}}\begin{bmatrix}e_0^{(2)}\\-e_0^{(2)}\end{bmatrix}$ | $\frac{1}{2}\begin{bmatrix}e_0^{(2)} & e_0^{(2)}\\je_0^{(2)} & -je_0^{(2)}\end{bmatrix}$ | $\frac{1}{\sqrt{6}}\begin{bmatrix}e_1^{(2)} & e_0^{(2)} & e_1^{(2)}\\e_1^{(2)} & -e_0^{(2)} & -e_1^{(2)}\end{bmatrix}$ | $\frac{1}{2\sqrt{2}}\begin{bmatrix}e_0^{(2)} & e_1^{(2)} & e_0^{(2)} & e_1^{(2)}\\je_0^{(2)} & je_1^{(2)} & -je_0^{(2)} & -je_1^{(2)}\end{bmatrix}$ |
| 2 | $\frac{1}{\sqrt{2}}\begin{bmatrix}e_0^{(2)}\\j \cdot e_0^{(2)}\end{bmatrix}$ | $\frac{1}{2}\begin{bmatrix}e_1^{(2)} & e_1^{(2)}\\e_1^{(2)} & -e_1^{(2)}\end{bmatrix}$ | $\frac{1}{\sqrt{6}}\begin{bmatrix}e_0^{(2)} & e_1^{(2)} & e_1^{(2)}\\e_0^{(2)} & e_1^{(2)} & -e_1^{(2)}\end{bmatrix}$ | — |
| 3 | $\frac{1}{\sqrt{2}}\begin{bmatrix}e_0^{(2)}\\-j \cdot e_0^{(2)}\end{bmatrix}$ | $\frac{1}{2}\begin{bmatrix}e_1^{(2)} & e_1^{(2)}\\je_1^{(2)} & -je_1^{(2)}\end{bmatrix}$ | $\frac{1}{\sqrt{6}}\begin{bmatrix}e_1^{(2)} & e_0^{(2)} & e_0^{(2)}\\e_1^{(2)} & e_0^{(2)} & -e_0^{(2)}\end{bmatrix}$ | — |
| 4 | $\frac{1}{\sqrt{2}}\begin{bmatrix}e_1^{(2)}\\e_1^{(2)}\end{bmatrix}$ | $\frac{1}{2}\begin{bmatrix}e_0^{(2)} & e_1^{(2)}\\e_0^{(2)} & -e_1^{(2)}\end{bmatrix}$ | — | — |
| 5 | $\frac{1}{\sqrt{2}}\begin{bmatrix}e_1^{(2)}\\-e_1^{(2)}\end{bmatrix}$ | $\frac{1}{2}\begin{bmatrix}e_0^{(2)} & e_1^{(2)}\\je_0^{(2)} & -je_1^{(2)}\end{bmatrix}$ | — | — |
| 6 | $\frac{1}{\sqrt{2}}\begin{bmatrix}e_1^{(2)}\\j \cdot e_1^{(2)}\end{bmatrix}$ | $\frac{1}{2}\begin{bmatrix}e_1^{(2)} & e_0^{(2)}\\e_1^{(2)} & -e_0^{(2)}\end{bmatrix}$ | — | — |
| 7 | $\frac{1}{\sqrt{2}}\begin{bmatrix}e_1^{(2)}\\-j \cdot e_1^{(2)}\end{bmatrix}$ | $\frac{1}{2}\begin{bmatrix}e_1^{(2)} & e_0^{(2)}\\je_1^{(2)} & -je_0^{(2)}\end{bmatrix}$ | — | — |

TABLE 7

| Codebook index, n | Number of layers $\upsilon$ | | | |
|---|---|---|---|---|
| | 1 | 2 | 3 | 4 |
| 0 | $\frac{1}{\sqrt{2}}\begin{bmatrix} e_0^{(4)} \\ e_0^{(4)} \end{bmatrix}$ | $\frac{1}{2}\begin{bmatrix} e_0^{(4)} & e_0^{(4)} \\ e_0^{(4)} & -e_0^{(4)} \end{bmatrix}$ | $\frac{1}{\sqrt{6}}\begin{bmatrix} e_0^{(4)} & e_0^{(4)} & e_1^{(4)} \\ e_0^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ e_0^{(4)} & e_1^{(4)} & -e_0^{(4)} & -e_1^{(4)} \end{bmatrix}$ |
| 1 | $\frac{1}{\sqrt{2}}\begin{bmatrix} e_0^{(4)} \\ -e_0^{(4)} \end{bmatrix}$ | $\frac{1}{2}\begin{bmatrix} e_0^{(4)} & e_0^{(4)} \\ je_0^{(4)} & -je_0^{(4)} \end{bmatrix}$ | $\frac{1}{\sqrt{6}}\begin{bmatrix} e_1^{(4)} & e_0^{(4)} & e_1^{(4)} \\ e_1^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ je_0^{(4)} & je_1^{(4)} & -je_0^{(4)} & -je_1^{(4)} \end{bmatrix}$ |
| 2 | $\frac{1}{\sqrt{2}}\begin{bmatrix} e_0^{(4)} \\ j\cdot e_0^{(4)} \end{bmatrix}$ | $\frac{1}{2}\begin{bmatrix} e_1^{(4)} & e_1^{(4)} \\ e_1^{(4)} & -e_1^{(4)} \end{bmatrix}$ | $\frac{1}{\sqrt{6}}\begin{bmatrix} e_0^{(4)} & e_0^{(4)} & e_1^{(4)} \\ e_0^{(4)} & e_1^{(4)} & -e_1^{(4)} \end{bmatrix}$ | $\frac{1}{2\sqrt{2}}\begin{bmatrix} e_1^{(4)} & e_2^{(4)} & e_1^{(4)} & e_2^{(4)} \\ e_1^{(4)} & e_2^{(4)} & -e_1^{(4)} & -e_2^{(4)} \end{bmatrix}$ |
| 3 | $\frac{1}{\sqrt{2}}\begin{bmatrix} e_0^{(4)} \\ -j\cdot e_0^{(4)} \end{bmatrix}$ | $\frac{1}{2}\begin{bmatrix} e_1^{(4)} & e_1^{(4)} \\ je_1^{(4)} & -je_1^{(4)} \end{bmatrix}$ | $\frac{1}{\sqrt{6}}\begin{bmatrix} e_1^{(4)} & e_0^{(4)} & e_0^{(4)} \\ e_1^{(4)} & e_0^{(4)} & -e_0^{(4)} \end{bmatrix}$ | $\frac{1}{2\sqrt{2}}\begin{bmatrix} e_1^{(4)} & e_2^{(4)} & e_1^{(4)} & e_2^{(4)} \\ je_1^{(4)} & je_2^{(4)} & -je_1^{(4)} & -je_2^{(4)} \end{bmatrix}$ |
| 4 | $\frac{1}{\sqrt{2}}\begin{bmatrix} e_1^{(4)} \\ e_1^{(4)} \end{bmatrix}$ | $\frac{1}{2}\begin{bmatrix} e_2^{(4)} & e_2^{(4)} \\ e_2^{(4)} & -e_1^{(4)} \end{bmatrix}$ | $\frac{1}{\sqrt{6}}\begin{bmatrix} e_1^{(4)} & e_1^{(4)} & e_2^{(4)} \\ e_1^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ e_2^{(4)} & e_3^{(4)} & -e_2^{(4)} & -e_3^{(4)} \end{bmatrix}$ |
| 5 | $\frac{1}{\sqrt{2}}\begin{bmatrix} e_1^{(4)} \\ -e_1^{(4)} \end{bmatrix}$ | $\frac{1}{2}\begin{bmatrix} e_2^{(4)} & e_2^{(4)} \\ je_2^{(4)} & -je_2^{(4)} \end{bmatrix}$ | $\frac{1}{\sqrt{6}}\begin{bmatrix} e_2^{(4)} & e_1^{(4)} & e_2^{(4)} \\ e_2^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ je_2^{(4)} & je_3^{(4)} & -je_2^{(4)} & -je_3^{(4)} \end{bmatrix}$ |
| 6 | $\frac{1}{\sqrt{2}}\begin{bmatrix} e_1^{(4)} \\ j\cdot e_1^{(4)} \end{bmatrix}$ | $\frac{1}{2}\begin{bmatrix} e_3^{(4)} & e_3^{(4)} \\ e_3^{(4)} & -e_3^{(4)} \end{bmatrix}$ | $\frac{1}{\sqrt{6}}\begin{bmatrix} e_1^{(4)} & e_2^{(4)} & e_2^{(4)} \\ e_1^{(4)} & e_2^{(4)} & -e_2^{(4)} \end{bmatrix}$ | $\frac{1}{2\sqrt{2}}\begin{bmatrix} e_3^{(4)} & e_0^{(4)} & e_3^{(4)} & e_0^{(4)} \\ e_3^{(4)} & e_0^{(4)} & -e_3^{(4)} & -e_0^{(4)} \end{bmatrix}$ |
| 7 | $\frac{1}{\sqrt{2}}\begin{bmatrix} e_1^{(4)} \\ -j\cdot e_1^{(4)} \end{bmatrix}$ | $\frac{1}{2}\begin{bmatrix} e_3^{(4)} & e_3^{(4)} \\ je_3^{(4)} & -je_3^{(4)} \end{bmatrix}$ | $\frac{1}{\sqrt{6}}\begin{bmatrix} e_2^{(4)} & e_1^{(4)} & e_1^{(4)} \\ e_2^{(4)} & e_1^{(4)} & -e_1^{(4)} \end{bmatrix}$ | $\frac{1}{2\sqrt{2}}\begin{bmatrix} e_3^{(4)} & e_0^{(4)} & e_3^{(4)} & e_0^{(4)} \\ je_3^{(4)} & je_0^{(4)} & -je_3^{(4)} & -je_0^{(4)} \end{bmatrix}$ |
| 8 | $\frac{1}{\sqrt{2}}\begin{bmatrix} e_1^{(4)} \\ e_2^{(4)} \end{bmatrix}$ | $\frac{1}{2}\begin{bmatrix} e_0^{(4)} & e_1^{(4)} \\ e_0^{(4)} & -e_1^{(4)} \end{bmatrix}$ | $\frac{1}{\sqrt{6}}\begin{bmatrix} e_2^{(4)} & e_2^{(4)} & e_3^{(4)} \\ e_2^{(4)} & -e_2^{(4)} & -e_3^{(4)} \end{bmatrix}$ | — |
| 9 | $\frac{1}{\sqrt{2}}\begin{bmatrix} e_2^{(4)} \\ -e_2^{(4)} \end{bmatrix}$ | $\frac{1}{2}\begin{bmatrix} e_0^{(4)} & e_1^{(4)} \\ je_0^{(4)} & -je_1^{(4)} \end{bmatrix}$ | $\frac{1}{\sqrt{6}}\begin{bmatrix} e_3^{(4)} & e_2^{(4)} & e_3^{(4)} \\ e_3^{(4)} & -e_2^{(4)} & -e_3^{(4)} \end{bmatrix}$ | — |
| 10 | $\frac{1}{\sqrt{2}}\begin{bmatrix} e_2^{(4)} \\ j\cdot e_2^{(4)} \end{bmatrix}$ | $\frac{1}{2}\begin{bmatrix} e_1^{(4)} & e_2^{(4)} \\ e_1^{(4)} & -e_2^{(4)} \end{bmatrix}$ | $\frac{1}{\sqrt{6}}\begin{bmatrix} e_2^{(4)} & e_3^{(4)} & e_3^{(4)} \\ e_2^{(4)} & e_3^{(4)} & -e_3^{(4)} \end{bmatrix}$ | — |
| 11 | $\frac{1}{\sqrt{2}}\begin{bmatrix} e_2^{(4)} \\ -j\cdot e_2^{(4)} \end{bmatrix}$ | $\frac{1}{2}\begin{bmatrix} e_1^{(4)} & e_2^{(4)} \\ je_1^{(4)} & -je_2^{(4)} \end{bmatrix}$ | $\frac{1}{\sqrt{6}}\begin{bmatrix} e_3^{(4)} & e_2^{(4)} & e_2^{(4)} \\ e_3^{(4)} & e_2^{(4)} & -e_2^{(4)} \end{bmatrix}$ | — |
| 12 | $\frac{1}{\sqrt{2}}\begin{bmatrix} e_3^{(4)} \\ e_3^{(4)} \end{bmatrix}$ | $\frac{1}{2}\begin{bmatrix} e_0^{(4)} & e_3^{(4)} \\ e_0^{(4)} & -e_3^{(4)} \end{bmatrix}$ | $\frac{1}{\sqrt{6}}\begin{bmatrix} e_3^{(4)} & e_3^{(4)} & e_0^{(4)} \\ e_3^{(4)} & -e_3^{(4)} & -e_0^{(4)} \end{bmatrix}$ | — |
| 13 | $\frac{1}{\sqrt{2}}\begin{bmatrix} e_3^{(4)} \\ -e_3^{(4)} \end{bmatrix}$ | $\frac{1}{2}\begin{bmatrix} e_0^{(4)} & e_3^{(4)} \\ je_0^{(4)} & -je_3^{(4)} \end{bmatrix}$ | $\frac{1}{\sqrt{6}}\begin{bmatrix} e_0^{(4)} & e_3^{(4)} & e_0^{(4)} \\ e_0^{(4)} & -e_3^{(4)} & -e_0^{(4)} \end{bmatrix}$ | — |
| 14 | $\frac{1}{\sqrt{2}}\begin{bmatrix} e_3^{(4)} \\ j\cdot e_3^{(4)} \end{bmatrix}$ | $\frac{1}{2}\begin{bmatrix} e_1^{(4)} & e_3^{(4)} \\ e_1^{(4)} & -e_3^{(4)} \end{bmatrix}$ | $\frac{1}{\sqrt{6}}\begin{bmatrix} e_3^{(4)} & e_0^{(4)} & e_0^{(4)} \\ e_3^{(4)} & e_0^{(4)} & -e_0^{(4)} \end{bmatrix}$ | — |
| 15 | $\frac{1}{\sqrt{2}}\begin{bmatrix} e_3^{(4)} \\ -j\cdot e_3^{(4)} \end{bmatrix}$ | $\frac{1}{2}\begin{bmatrix} e_1^{(4)} & e_3^{(4)} \\ je_1^{(4)} & -je_3^{(4)} \end{bmatrix}$ | $\frac{1}{\sqrt{6}}\begin{bmatrix} e_0^{(4)} & e_3^{(4)} & e_3^{(4)} \\ e_0^{(4)} & e_3^{(4)} & -e_3^{(4)} \end{bmatrix}$ | — |

In Tables 5 to 7, if k is x (yet, k,l∈{0,1, . . . ,N−1}), $e_k^{(N)}$ means a column vector of length N in which an $x^{th}$ element is 1 only and the rest of elements are 0.

In such a case, if a base station configures a DM-RS based open-loop or semi-open-loop transmission for a UE, the UE calculates CQI using one W2 PMI in Tables 5 to 7 according to the number of the beamformed CSI-RS ports. In such a case, the present invention proposes to apply circular cycling by grouping precoders according to the codebook property per rank. Tables 8 to 10 are examples of grouping precoders in Tables 5 to 7. Particularly, it can be observed that a single PMI group is grouped into a single block.

TABLE 8

| Codebook index, n | Number of layers υ | |
|---|---|---|
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |

TABLE 8-continued

| Codebook index, n | Number of layers υ | |
|---|---|---|
| | 1 | 2 |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |

TABLE 9

| Codebook index, n | Number of layers υ | | | |
|---|---|---|---|---|
| | 1 | 2 | 3 | 4 |
| 0 | $\frac{1}{\sqrt{2}}\begin{bmatrix}e_0^{(2)}\\e_0^{(2)}\end{bmatrix}$ | $\frac{1}{2}\begin{bmatrix}e_0^{(2)} & e_0^{(2)}\\e_0^{(2)} & -e_0^{(2)}\end{bmatrix}$ | $\frac{1}{\sqrt{6}}\begin{bmatrix}e_0^{(2)} & e_0^{(2)} & e_1^{(2)}\\e_0^{(2)} & -e_0^{(2)} & -e_1^{(2)}\end{bmatrix}$ | $\frac{1}{2\sqrt{2}}\begin{bmatrix}e_0^{(2)} & e_1^{(2)} & e_0^{(2)} & e_1^{(2)}\\e_0^{(2)} & e_1^{(2)} & -e_0^{(2)} & -e_1^{(2)}\end{bmatrix}$ |
| 1 | $\frac{1}{\sqrt{2}}\begin{bmatrix}e_0^{(2)}\\-e_0^{(2)}\end{bmatrix}$ | $\frac{1}{2}\begin{bmatrix}e_0^{(2)} & e_0^{(2)}\\je_0^{(2)} & -je_0^{(2)}\end{bmatrix}$ | $\frac{1}{\sqrt{6}}\begin{bmatrix}e_1^{(2)} & e_0^{(2)} & e_1^{(2)}\\e_1^{(2)} & -e_0^{(2)} & -e_1^{(2)}\end{bmatrix}$ | $\frac{1}{2\sqrt{2}}\begin{bmatrix}e_0^{(2)} & e_1^{(2)} & e_0^{(2)} & e_1^{(2)}\\je_0^{(2)} & je_1^{(2)} & -je_0^{(2)} & -je_1^{(2)}\end{bmatrix}$ |
| 2 | $\frac{1}{\sqrt{2}}\begin{bmatrix}e_0^{(2)}\\j\cdot e_0^{(2)}\end{bmatrix}$ | $\frac{1}{2}\begin{bmatrix}e_1^{(2)} & e_1^{(2)}\\e_1^{(2)} & -e_1^{(2)}\end{bmatrix}$ | $\frac{1}{\sqrt{6}}\begin{bmatrix}e_0^{(2)} & e_1^{(2)} & e_1^{(2)}\\e_0^{(2)} & e_1^{(2)} & -e_1^{(2)}\end{bmatrix}$ | — |
| 3 | $\frac{1}{\sqrt{2}}\begin{bmatrix}e_0^{(2)}\\-j\cdot e_0^{(2)}\end{bmatrix}$ | $\frac{1}{2}\begin{bmatrix}e_1^{(2)} & e_1^{(2)}\\je_1^{(2)} & -je_1^{(2)}\end{bmatrix}$ | $\frac{1}{\sqrt{6}}\begin{bmatrix}e_1^{(2)} & e_0^{(2)} & e_0^{(2)}\\e_1^{(2)} & e_0^{(2)} & -e_0^{(2)}\end{bmatrix}$ | — |
| 4 | $\frac{1}{\sqrt{2}}\begin{bmatrix}e_1^{(2)}\\e_1^{(2)}\end{bmatrix}$ | $\frac{1}{2}\begin{bmatrix}e_0^{(2)} & e_1^{(2)}\\e_0^{(2)} & -e_1^{(2)}\end{bmatrix}$ | — | — |
| 5 | $\frac{1}{\sqrt{2}}\begin{bmatrix}e_1^{(2)}\\-e_1^{(2)}\end{bmatrix}$ | $\frac{1}{2}\begin{bmatrix}e_0^{(2)} & e_1^{(2)}\\je_0^{(2)} & -je_1^{(2)}\end{bmatrix}$ | — | — |
| 6 | $\frac{1}{\sqrt{2}}\begin{bmatrix}e_1^{(2)}\\j\cdot e_1^{(2)}\end{bmatrix}$ | $\frac{1}{2}\begin{bmatrix}e_1^{(2)} & e_0^{(2)}\\e_1^{(2)} & -e_0^{(2)}\end{bmatrix}$ | — | — |
| 7 | $\frac{1}{\sqrt{2}}\begin{bmatrix}e_1^{(2)}\\-j\cdot e_1^{(2)}\end{bmatrix}$ | $\frac{1}{2}\begin{bmatrix}e_1^{(2)} & e_0^{(2)}\\je_1^{(2)} & -je_0^{(2)}\end{bmatrix}$ | — | — |

TABLE 10

| Codebook index, n | Number of layers υ | | | |
|---|---|---|---|---|
| | 1 | 2 | 3 | 4 |
| 0 | $\frac{1}{\sqrt{2}}\begin{bmatrix}e_0^{(4)}\\e_0^{(4)}\end{bmatrix}$ | $\frac{1}{2}\begin{bmatrix}e_0^{(4)} & e_0^{(4)}\\e_0^{(4)} & -e_0^{(4)}\end{bmatrix}$ | $\frac{1}{\sqrt{6}}\begin{bmatrix}e_0^{(4)} & e_0^{(4)} & e_1^{(4)}\\e_0^{(4)} & -e_0^{(4)} & -e_1^{(4)}\end{bmatrix}$ | $\frac{1}{2\sqrt{2}}\begin{bmatrix}e_0^{(4)} & e_1^{(4)} & e_0^{(4)} & e_1^{(4)}\\e_0^{(4)} & e_1^{(4)} & -e_0^{(4)} & -e_1^{(4)}\end{bmatrix}$ |

TABLE 10-continued

| Codebook index, n | Number of layers υ | | | |
|---|---|---|---|---|
| | 1 | 2 | 3 | 4 |
| 1 | $\frac{1}{\sqrt{2}}\begin{bmatrix} e_0^{(4)} \\ -e_0^{(4)} \end{bmatrix}$ | $\frac{1}{2}\begin{bmatrix} e_0^{(4)} & e_0^{(4)} \\ je_0^{(4)} & -je_0^{(4)} \end{bmatrix}$ | $\frac{1}{\sqrt{6}}\begin{bmatrix} e_1^{(4)} & e_0^{(4)} & e_1^{(4)} \\ e_1^{(4)} & -e_0^{(4)} & -e_1^{(4)} \end{bmatrix}$ | $\frac{1}{2\sqrt{2}}\begin{bmatrix} e_0^{(4)} & e_1^{(4)} & e_0^{(4)} & e_1^{(4)} \\ je_0^{(4)} & je_1^{(4)} & -je_0^{(4)} & -je_1^{(4)} \end{bmatrix}$ |
| 2 | $\frac{1}{\sqrt{2}}\begin{bmatrix} e_0^{(4)} \\ j\cdot e_0^{(4)} \end{bmatrix}$ | $\frac{1}{2}\begin{bmatrix} e_1^{(4)} & e_1^{(4)} \\ e_1^{(4)} & -e_1^{(4)} \end{bmatrix}$ | $\frac{1}{\sqrt{6}}\begin{bmatrix} e_0^{(4)} & e_1^{(4)} & e_1^{(4)} \\ e_0^{(4)} & e_1^{(4)} & -e_1^{(4)} \end{bmatrix}$ | $\frac{1}{2\sqrt{2}}\begin{bmatrix} e_1^{(4)} & e_2^{(4)} & e_1^{(4)} & e_2^{(4)} \\ e_1^{(4)} & e_2^{(4)} & -e_1^{(4)} & -e_2^{(4)} \end{bmatrix}$ |
| 3 | $\frac{1}{\sqrt{2}}\begin{bmatrix} e_0^{(4)} \\ -j\cdot e_0^{(4)} \end{bmatrix}$ | $\frac{1}{2}\begin{bmatrix} e_1^{(4)} & e_1^{(4)} \\ je_1^{(4)} & -je_1^{(4)} \end{bmatrix}$ | $\frac{1}{\sqrt{6}}\begin{bmatrix} e_1^{(4)} & e_0^{(4)} & e_0^{(4)} \\ e_1^{(4)} & e_0^{(4)} & -e_0^{(4)} \end{bmatrix}$ | $\frac{1}{2\sqrt{2}}\begin{bmatrix} e_1^{(4)} & e_2^{(4)} & e_1^{(4)} & e_2^{(4)} \\ je_1^{(4)} & je_2^{(4)} & -je_1^{(4)} & -je_2^{(4)} \end{bmatrix}$ |
| 4 | $\frac{1}{\sqrt{2}}\begin{bmatrix} e_1^{(4)} \\ e_1^{(4)} \end{bmatrix}$ | $\frac{1}{2}\begin{bmatrix} e_2^{(4)} & e_2^{(4)} \\ e_2^{(4)} & -e_2^{(4)} \end{bmatrix}$ | $\frac{1}{\sqrt{6}}\begin{bmatrix} e_1^{(4)} & e_1^{(4)} & e_2^{(4)} \\ e_1^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ e_2^{(4)} & e_3^{(4)} & -e_2^{(4)} & -e_3^{(4)} \end{bmatrix}$ |
| 5 | $\frac{1}{\sqrt{2}}\begin{bmatrix} e_1^{(4)} \\ -e_1^{(4)} \end{bmatrix}$ | $\frac{1}{2}\begin{bmatrix} e_2^{(4)} & e_2^{(4)} \\ je_2^{(4)} & -je_2^{(4)} \end{bmatrix}$ | $\frac{1}{\sqrt{6}}\begin{bmatrix} e_2^{(4)} & e_1^{(4)} & e_2^{(4)} \\ e_2^{(4)} & -e_1^{(4)} & -e_2^{(4)} \end{bmatrix}$ | $\frac{1}{2\sqrt{2}}\begin{bmatrix} e_2^{(4)} & e_3^{(4)} & e_2^{(4)} & e_3^{(4)} \\ je_2^{(4)} & je_3^{(4)} & -je_2^{(4)} & -je_3^{(4)} \end{bmatrix}$ |
| 6 | $\frac{1}{\sqrt{2}}\begin{bmatrix} e_1^{(4)} \\ j\cdot e_1^{(4)} \end{bmatrix}$ | $\frac{1}{2}\begin{bmatrix} e_3^{(4)} & e_3^{(4)} \\ e_3^{(4)} & -e_3^{(4)} \end{bmatrix}$ | $\frac{1}{\sqrt{6}}\begin{bmatrix} e_1^{(4)} & e_2^{(4)} & e_2^{(4)} \\ e_1^{(4)} & e_2^{(4)} & -e_2^{(4)} \end{bmatrix}$ | $\frac{1}{2\sqrt{2}}\begin{bmatrix} e_3^{(4)} & e_0^{(4)} & e_3^{(4)} & e_0^{(4)} \\ e_3^{(4)} & e_0^{(4)} & -e_3^{(4)} & -e_0^{(4)} \end{bmatrix}$ |
| 7 | $\frac{1}{\sqrt{2}}\begin{bmatrix} e_1^{(4)} \\ -j\cdot e_1^{(4)} \end{bmatrix}$ | $\frac{1}{2}\begin{bmatrix} e_3^{(4)} & e_3^{(4)} \\ je_3^{(4)} & -je_3^{(4)} \end{bmatrix}$ | $\frac{1}{\sqrt{6}}\begin{bmatrix} e_2^{(4)} & e_1^{(4)} & e_1^{(4)} \\ e_2^{(4)} & e_1^{(4)} & -e_1^{(4)} \end{bmatrix}$ | $\frac{1}{2\sqrt{2}}\begin{bmatrix} e_3^{(4)} & e_0^{(4)} & e_3^{(4)} & e_0^{(4)} \\ je_3^{(4)} & je_0^{(4)} & -je_3^{(4)} & -je_0^{(4)} \end{bmatrix}$ |
| 8 | $\frac{1}{\sqrt{2}}\begin{bmatrix} e_2^{(4)} \\ e_2^{(4)} \end{bmatrix}$ | $\frac{1}{2}\begin{bmatrix} e_0^{(4)} & e_1^{(4)} \\ e_0^{(4)} & -e_1^{(4)} \end{bmatrix}$ | $\frac{1}{\sqrt{6}}\begin{bmatrix} e_2^{(4)} & e_2^{(4)} & e_3^{(4)} \\ e_2^{(4)} & -e_2^{(4)} & -e_3^{(4)} \end{bmatrix}$ | — |
| 9 | $\frac{1}{\sqrt{2}}\begin{bmatrix} e_2^{(4)} \\ -e_2^{(4)} \end{bmatrix}$ | $\frac{1}{2}\begin{bmatrix} e_0^{(4)} & e_1^{(4)} \\ je_0^{(4)} & -je_1^{(4)} \end{bmatrix}$ | $\frac{1}{\sqrt{6}}\begin{bmatrix} e_3^{(4)} & e_2^{(4)} & e_3^{(4)} \\ e_3^{(4)} & -e_2^{(4)} & -e_3^{(4)} \end{bmatrix}$ | — |
| 10 | $\frac{1}{\sqrt{2}}\begin{bmatrix} e_2^{(4)} \\ j\cdot e_2^{(4)} \end{bmatrix}$ | $\frac{1}{2}\begin{bmatrix} e_1^{(4)} & e_2^{(4)} \\ e_1^{(4)} & -e_2^{(4)} \end{bmatrix}$ | $\frac{1}{\sqrt{6}}\begin{bmatrix} e_2^{(4)} & e_3^{(4)} & e_3^{(4)} \\ e_2^{(4)} & e_3^{(4)} & -e_3^{(4)} \end{bmatrix}$ | — |
| 11 | $\frac{1}{\sqrt{2}}\begin{bmatrix} e_2^{(4)} \\ -j\cdot e_2^{(4)} \end{bmatrix}$ | $\frac{1}{2}\begin{bmatrix} e_1^{(4)} & e_2^{(4)} \\ je_1^{(4)} & -je_2^{(4)} \end{bmatrix}$ | $\frac{1}{\sqrt{6}}\begin{bmatrix} e_3^{(4)} & e_2^{(4)} & e_2^{(4)} \\ e_3^{(4)} & e_2^{(4)} & -e_2^{(4)} \end{bmatrix}$ | — |
| 12 | $\frac{1}{\sqrt{2}}\begin{bmatrix} e_3^{(4)} \\ e_3^{(4)} \end{bmatrix}$ | $\frac{1}{2}\begin{bmatrix} e_0^{(4)} & e_3^{(4)} \\ e_0^{(4)} & -e_3^{(4)} \end{bmatrix}$ | $\frac{1}{\sqrt{6}}\begin{bmatrix} e_3^{(4)} & e_3^{(4)} & e_0^{(4)} \\ e_3^{(4)} & -e_3^{(4)} & -e_0^{(4)} \end{bmatrix}$ | — |
| 13 | $\frac{1}{\sqrt{2}}\begin{bmatrix} e_3^{(4)} \\ -e_3^{(4)} \end{bmatrix}$ | $\frac{1}{2}\begin{bmatrix} e_0^{(4)} & e_3^{(4)} \\ je_0^{(4)} & -je_3^{(4)} \end{bmatrix}$ | $\frac{1}{\sqrt{6}}\begin{bmatrix} e_0^{(4)} & e_3^{(4)} & e_0^{(4)} \\ e_0^{(4)} & -e_3^{(4)} & -e_0^{(4)} \end{bmatrix}$ | — |
| 14 | $\frac{1}{\sqrt{2}}\begin{bmatrix} e_3^{(4)} \\ j\cdot e_3^{(4)} \end{bmatrix}$ | $\frac{1}{2}\begin{bmatrix} e_1^{(4)} & e_3^{(4)} \\ e_1^{(4)} & -e_3^{(4)} \end{bmatrix}$ | $\frac{1}{\sqrt{6}}\begin{bmatrix} e_3^{(4)} & e_0^{(4)} & e_0^{(4)} \\ e_3^{(4)} & e_0^{(4)} & -e_0^{(4)} \end{bmatrix}$ | — |
| 15 | $\frac{1}{\sqrt{2}}\begin{bmatrix} e_3^{(4)} \\ -j\cdot e_3^{(4)} \end{bmatrix}$ | $\frac{1}{2}\begin{bmatrix} e_1^{(4)} & e_3^{(4)} \\ je_1^{(4)} & -je_3^{(4)} \end{bmatrix}$ | $\frac{1}{\sqrt{6}}\begin{bmatrix} e_0^{(4)} & e_3^{(4)} & e_3^{(4)} \\ e_0^{(4)} & e_3^{(4)} & -e_3^{(4)} \end{bmatrix}$ | — |

In more particular, CQI is calculated on the assumption that PMI existing in a group shown in Tables 8 to 10 is circularly cycled, i.e., circularly applied in RE unit or RE group unit within a single RB (or, RBs bundled if PRB bundling is activated), and an RE level diversity gain is then obtained as a result. Moreover, CQI is calculated on the assumption that a PMI group itself is circularly cycled, i.e., circularly applied in unit of one RB (or, RBs bundled if PRB bundling is activated), and a diversity gain is also obtained in RB unit as a result.

Referring to Tables 8 to 10, PMIs having the same vector $e_k^{(N)}$ form a PMI group, and PMIs in the PMI group have the structure that a co-phase is changed. If k is x (yet, k,l∈{0, 1, . . . ,N−1}), the vector $e_k^{(N)}$ means a column vector of a length N in which an $x^{th}$ element is 1 and the rest is 0. Hence, it can be observed that it corresponds to an antenna port selection of a precoder.

As a result, an antenna port selection is circulated in RB unit (or bundled RB unit) and a co-phase is circulated in RE unit (or RE group unit). This is because the variation of a co-phase among channel elements is greater than the beam variation corresponding to an antenna port selection. So to speak, when a PMI group is generated, different antenna ports (i.e., different beams) are guaranteed so as to be selected between PMI groups and different co-phase elements are guaranteed within a PMI group despite the same antenna port.

The following description is made with reference to 8 port CSI-RS, which is exemplary only. The following description is identically applicable to a case that the number of antenna ports is different.

In case that 8 port CSI-RS is configured, CSI is calculated using Table 10. Particularly, if a UE assumes rank 1, the UE sets groups as PMI group #0={0, 1, 2, 3}, PMI group #1={4, 5, 6, 7}, PMI group #2={8, 9, 10, 11}, and PMI group #3={12, 13, 14, 15} and then calculates CQI on the assumption that PMI groups #0 to #3 are circularly applied in RB (or bundled RB) unit. Namely, the UE calculates CQI on the assumption that data is transmitted using PMI group #(I modular 4) at RB #i.

Moreover, within a single RB (or a bundled RB), CQI is calculated on the assumption that PMI existing in a corresponding PMI group is circularly applied in RE unit or RE group unit. Namely, at RB #0, CQI is calculated on the assumption that PMI indexes applied in RE unit (or RE group unit) are 0, 1, 2, 3, 0, 1, 2, 3, 0, 1, 2, 3 . . . And, at RB #1, CQI is calculated on the assumption that PMI indexes applied in RE unit (or RE group unit) are 4, 5, 6, 7, 4, 5, 6, 7, 4, 5, 6, 7 . . .

Yet, at rank 2, it is preferable that beam cycling is not applied to a PMI group denoted by a broken line among PMI groups in Table 10. Regarding the PMI group denoted by the broken line, since two vectors are configured with different antenna port selection vectors (i.e., $e_k^{(N)}$), they are applied to layers as different beams, respectively. Although such a precoder may become an additional gain in a closed-loop transmission, it is difficult to expect an additional gain in an open-loop transmission already securing a sufficient diversity gain owing to the circular cycling. And, such a precoder increases implementation complexity.

Moreover, since every PMI has an antenna port selection vector (i.e., $e_k^{(N)}$) per layer over rank 3, it is preferably included in a circular cycling target. And, a PMI group is configured in a manner that PMIs belonging to the same PMI group include the same antenna port selection vectors. Namely, at rank 3, PMIs are grouped into PMI group #0={0, 1, 2, 3}, PMI group #1={4, 5, 6, 7}, PMI group #2={8, 9, 10, 11}, and PMI group #3={12, 13, 14, 15}, PMI of PMI group #0 consists of $\{e_0, e_1\}$, PMI of PMI group #1 consists of $\{e_2, e_1\}$, PMI of PMI group #2 consists of $\{e_2, e_3\}$, and PMI of PMI group #3 consists of $\{e_0, e_3\}$. And, PMI belonging to the same PMI group is defined as a different co-phase.

Of course, the PMI group denoted by the broken line in the above proposal may be included in case of circular cycling. Yet, information on it may be signaled to a UE by a base station. On the contrary, information indicating that CQI is calculated by applying the PMI group denoted by the broken line can be signaled to the base station by the UE.

In case of applying the semi-open-loop transmission that a UE reports partial information of W2 to a base station, the above-proposed method can be utilized in a manner of being modified in part. For example, a UE selects and reports a PMI group for W2 and is able to calculate CQI by circularly applying PMI within the PMI group. Assuming rank 1 in 8 port CSI-RS, a UE selects and reports a first PMI group as a PMI group for W2 and then calculates CQI on the assumption that PMIs are circularly applied within the first PMI group. If the reporting of the PMI group for W2 is performed in WB unit, i.e., full band unit, a UE fixes a PMI group for W2 for the full band to a PMI group for the W2 and calculates CQI on the assumption that PMIs are circularly applied within the corresponding group. On the other hand, if the reporting of a PMI group for W2 is performed in SubBand (SB) unit, a UE fixes a PMI group for W2 for the SB to a PMI group for the W2 and calculates CQI on the assumption that PMIs are circularly applied within the corresponding group.

Moreover, a base station and UE agree that the reporting of a PMI group for W2 is made in a manner of reporting PMI having a smallest index within the PMI group. For example, assuming rank 1 in 8 port CSI-RS, a UE reports PMI=0 to report PMI group #0 and calculates CQI by circularly applying PMI in RE unit within the PMI group #0.

In some implementations, in a dual codebook structure in which both W1 and W2 exist, the proposals of the W2 independent feedback are applicable. Namely, CQI is calculated on the assumptions of configuring PMI groups (i.e., PMI group for i2) for W2 of a dual codebook, circularly applying a PMI group in RB or bundled RB unit, and circularly applying PMIs within a PMI group in RE or RE group unit. Yet, since W1 exists, assumption for W1 is additionally necessary for CQI calculation. In case of an open-loop transmission, since a UE does not report W1, CQI is calculated by circularly applying W1 in specific RB group unit. In case of a semi-open-loop transmission, since a UE reports W1, CQI is calculated by assuming the reported W1.

In some implementations, a dual codebook for rank R can be represented by being generalized like Equation 17. In Equation 17, $\Phi_{ni}$ and $V_{mi}$ mean a co-phase and beam applied to an $i^{th}$ layer, respectively.

$$\begin{bmatrix} V_{m1} & V_{m2} & \cdots & V_{mR} \\ \Phi_{n1}V_{m1} & \Phi_{n2}V_{m2} & & \Phi_{nR}V_{mR} \end{bmatrix} \qquad \text{[Equation 17]}$$

In the dual codebook for the rank R, PMI of W2 belonging to the same PMI group for W2, i.e., i2 has the same set $\{V_{mi}|i=0,1, \ldots R\}$ but has a different co-phase $\Phi_{ni}$. (Yet, in case of Class A codebook, it is defined by being divided into an index mi and a pair of two indexes.) Namely, an index mi is defined as (mi_V, mi_H). In this case, i2 belonging to the same PMI group for W2 has the same set $\{V_{mi\_V, mi\_H}|i=0, 1, \ldots R\}$ but has a different co-phase $\Phi_{ni}$.

For example, at rank 1 of a 4Tx dual codebook like Table 11, i2 consists of PMI group #0={0, 1, 2, 3}, PMI group #1={4, 5, 6, 7}, PMI group #2={8, 9, 10, 11}, and PMI group #3={12, 13, 14, 15}.

TABLE 11

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ | where $W_{m,n}^{(1)} = \frac{1}{2}\begin{bmatrix} v'_m \\ \varphi'_n v'_m \end{bmatrix}$ At rank 2 of a 4Tx dual codebook like Table 12, i2 consists of PMI group #0={0, 1}, PMI group #1={2, 3}, PMI group #2={4, 5}, PMI group #3={6, 7}, PMI group #4={8, 9}, PMI group #5={10, 11}, PMI group #6={12, 13}, and PMI group #7={14, 15}. Since PMIs of PMI group #3={6, 7}, PMI group #4={8, 9}, PMI group #5={10, 11}, PMI group #6={12, 13}, and PMI group #7={14, 15} apply different beams to two layers, respectively, they are excluded from the PMI groups and circular cycling can be performed on the rest of the PMI groups. For 8Tx codebook, 12Tx codebook, 16Tx codebook and the like, if two beams of rank 2 consist of different beams, i.e., $V_{m1} \neq V_{m2}$, they are preferably excluded from the circularly applied PMI group.

TABLE 12

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

TABLE 12-continued

| | $i_2$ | | | |
|---|---|---|---|---|
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| | $i_2$ | | | |
|---|---|---|---|---|
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| | $i_2$ | | | |
|---|---|---|---|---|
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ | where $W_{m,m',n}^{(2)} = \frac{1}{\sqrt{8}}\begin{bmatrix} v'_m & v'_{m'} \\ \varphi_n v'_m & -\varphi_n v'_{m'} \end{bmatrix}$ In case of rank 3 of 4Tx codebook like table 13 or rank 4 like Table 14, since a single precoder is applied only, the precoder circular cycling pattern in the existing LD-CDD scheme is exactly applicable.

TABLE 13

| | $i_2$ | | | | | | | |
|---|---|---|---|---|---|---|---|---|
| $i_1$ | 0 | 1 | 2 | 3 | 4 | 5 | 6 | 7 |
| 0 | $W_0^{(124)}/\sqrt{3}$ | $W_1^{(123)}/\sqrt{3}$ | $W_2^{(123)}/\sqrt{3}$ | $W_3^{(123)}/\sqrt{3}$ | $W_4^{(124)}/\sqrt{3}$ | $W_5^{(124)}/\sqrt{3}$ | $W_6^{(134)}/\sqrt{3}$ | $W_7^{(134)}/\sqrt{3}$ |

| | $i_2$ | | | | | | | |
|---|---|---|---|---|---|---|---|---|
| $i_1$ | 8 | 9 | 10 | 11 | 12 | 13 | 14 | 15 |
| 0 | $W_8^{(124)}/\sqrt{3}$ | $W_9^{(134)}/\sqrt{3}$ | $W_{10}^{(123)}/\sqrt{3}$ | $W_{11}^{(134)}/\sqrt{3}$ | $W_{12}^{(123)}/\sqrt{3}$ | $W_{13}^{(123)}/\sqrt{3}$ | $W_{14}^{(123)}/\sqrt{3}$ | $W_{15}^{(123)}/\sqrt{3}$ |

TABLE 14

| | $i_2$ | | | | | | | |
|---|---|---|---|---|---|---|---|---|
| $i_1$ | 0 | 1 | 2 | 3 | 4 | 5 | 6 | 7 |
| 0 | $W_0^{(1234)}/2$ | $W_1^{(1234)}/2$ | $W_2^{(3214)}/2$ | $W_3^{(3214)}/2$ | $W_4^{(1234)}/2$ | $W_5^{(1234)}/2$ | $W_6^{(1324)}/2$ | $W_7^{(1324)}/2$ |

| | $i_2$ | | | | | | | |
|---|---|---|---|---|---|---|---|---|
| $i_1$ | 8 | 9 | 10 | 11 | 12 | 13 | 14 | 15 |
| 0 | $W_8^{(1234)}/2$ | $W_9^{(1234)}/2$ | $W_{10}^{(1324)}/2$ | $W_{11}^{(1324)}/2$ | $W_{12}^{(1234)}/2$ | $W_{13}^{(1324)}/2$ | $W_{14}^{(3214)}/2$ | $W_{15}^{(1234)}/2$ |

Although the 4Tx dual codebook is described as one example, the above description is identically applicable to 8Tx dual codebook, 12Tx dual codebook, 16Tx dual codebook and the like.

Figure 12:
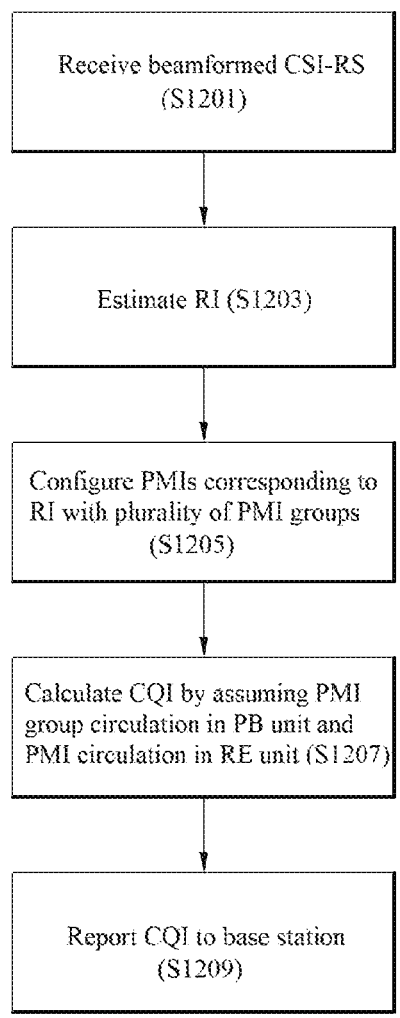
FIG. 12 is a flowchart for a method of reporting CSI according to an embodiment of the present invention.

FIG. 12 is a flowchart for a method of reporting CSI according to an embodiment of the present invention. Particularly, FIG. 12 shows an example of a CQI calculating method that assumes a beam cycling scheme in case of an open-loop transmission according to an embodiment of the present invention.

Referring to FIG. 12, first of all, in a step 1201, a UE receives Channel Status Information-Reference Signal (CSI-RS) defined as two or more antenna ports from a base station. Here, the CSI-RS is preferably beamformed. Subsequently, in a step 1203, the UE estimates a rank of a DL channel, i.e., RU based on the CSI-RS.

Subsequently, in a step 1205, as described above, the UE configures PMIs corresponding to the RI into a plurality of PMI groups. Particularly, as shown in Tables 8 to 10, PMIs corresponding to the estimated rank are grouped into two or more PMI groups. Preferably, each of the PMIs is configured as an antenna port selection vector $e_k^{(N)}$ and PMIs belonging to a same PMI group are configured as the same antenna port vector. Therefore, it is guaranteed that different antenna ports (i.e., different beams) are selected between PMI groups. And, it is also guaranteed that the same antenna port has a different co-phase element within a PMI group.

Thereafter, in a step 1207, on the assumption that the two or more PMI groups are circularly applied in resource block unit (or bundled resource block unit) and that PMIs included in the PMI group circularly applied to each of the resource blocks (or the bundled resource blocks) are circularly applied in resource element unit (or resource element group unit) at least, the UE calculates CQI. Here, the resource block unit can be replaced by a subband unit. In this case, the CQI can be calculated in subband unit. In such a case, since PMIs included in the same PMI group consist of the same antenna port vector, CQI information can be regarded as indicating antenna port information in subband unit implicitly.

Finally, in a step 1209, the UE reports CSI including the calculated CQI to the base station. Here, the CSI may include the RI.

Figure 13:
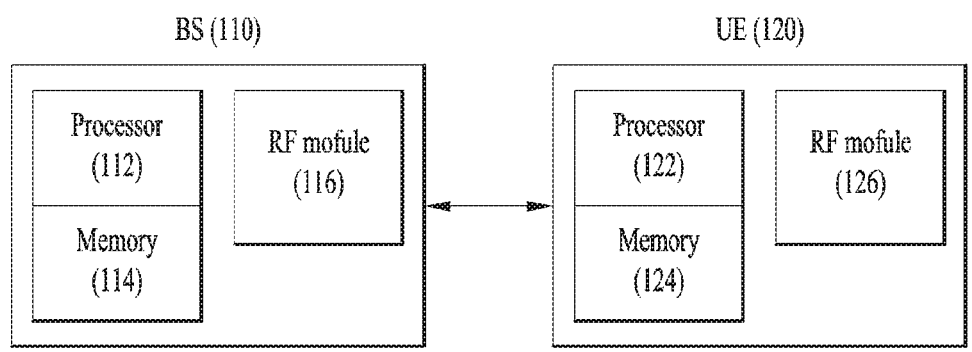
FIG. 13 shows a base station and user equipment applicable to an embodiment of the present invention.

FIG. 13 shows a base station and user equipment applicable to an embodiment of the present invention.

Referring to FIG. 13, a wireless communication system includes a Base Station (BS) 110 and a User Equipment (UE) 120. The BS 110 includes a processor 112, a memory 114 and a Radio Frequency (RF) unit 116. The processor 112 may be configured to implement procedures and/or methods proposed by the present invention. The memory 114 is connected to the processor 112 and stores various informations related to operations of the processor 112. The RF unit 116 is connected to the processor 112 and transmits and/or receives a wireless signal. The UE 120 includes a processor 122, a memory 124 and an RF unit 126. The processor 122 may be configured to implement procedures and/or methods proposed by the present invention. The memory 124 is connected to the processor 122 and stores various informations related to operations of the processor 122. The RF unit 126 is connected to the processor 122 and transmits and/or receives a wireless signal. The BS 110 and/or UE 120 may have a single antenna or multiple antennas.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, a base station may be substituted with such a terminology as a fixed station, a Node B, an eNode B (eNB), an access point (AP) or the like.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

The memory unit is provided within or outside the processor to exchange data with the processor through the various means known to the public.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the aforementioned method of feeding back hybrid CSI for open-loop MIMO transmission in a wireless communication system and apparatus therefor are described by focusing on examples applying to the 3GPP LTE system, they are applicable to various wireless communication systems as well as to the 3GPP LTE system.

What is claimed is:

1. A method of reporting Channel Status Information (CSI) to a base station by a user equipment in a wireless communication system, the method comprising:
receiving Channel Status Information-Reference Signal (CSI-RS) defined as two or more antenna ports from the base station;
estimating a rank of a downlink channel based on the CSI-RS;

configuring a plurality of precoders corresponding to the estimated rank into two or more precoder groups;

calculating Channel Quality Indicator (CQI) by applying the two or more precoder groups circularly in at least one resource block unit and by applying precoders included in the circularly applied precoder group circularly in at least one resource element unit; and reporting the CSI including the calculated CQI to the base station, wherein each of the plurality of the precoders is configured with antenna port selection vectors, and wherein precoders included in a same precoder group are configured with same antenna port vectors having different co-phases.

2. The method of claim 1, wherein the at least one resource block unit is a subband unit and wherein the calculating the CQI comprises calculating the CQI in the subband unit.

3. The method of claim 1, wherein the CSI reported to the base station includes information on the estimated rank.

4. A user equipment in a wireless communication system, the user equipment comprising:
a wireless communication module; and
a processor connected to the wireless communication module, the processor configured to receive Channel Status Information-Reference Signal (CSI-RS) defined as two or more antenna ports from a base station, wherein the processor is further configured to:
estimate a rank of a downlink channel based on the CSI-RS, configure a plurality of precoders corresponding to the estimated rank into two or more precoder groups, calculate Channel Quality Indicator (CQI) by applying the two or more precoder groups circularly in at least one resource block unit and by applying precoders included in the circularly applied precoder group circularly in at least one resource element unit, and report the CSI including the calculated CQI to the base station, wherein each of the plurality of the precoders is configured with antenna port selection vectors, and wherein precoders included in a same precoder group are configured with same antenna port vectors having different co-phases.

5. The user equipment of claim 4, wherein the at least one resource block unit is a subband unit and wherein the CQI is calculated in the subband unit.

6. The user equipment of claim 4, wherein the CSI reported to the base station includes information on the estimated rank.

* * * * *